(12) United States Patent
Doney et al.

(10) Patent No.: US 12,476,800 B2
(45) Date of Patent: Nov. 18, 2025

(54) METHOD, APPARATUS, AND COMPUTER-READABLE MEDIUM FOR AUTHENTICATION AND AUTHORIZATION OF NETWORKED DATA TRANSACTIONS

(71) Applicant: Securrency, Inc., Annapolis, MD (US)

(72) Inventors: George Daniel Doney, Riva, MD (US); Ihor Yermakov, Arlington, VA (US); Ilya Shkapo, Kharkov (UA); Oleksii Korzhuk, Kharkov (UA)

(73) Assignee: DTCC DIGITAL (US) INC., Jersey City, NJ (US)

( * ) Notice: Subject to any disclaimer, the term of this patent is extended or adjusted under 35 U.S.C. 154(b) by 212 days.

(21) Appl. No.: 18/369,563

(22) Filed: Sep. 18, 2023

(65) Prior Publication Data

US 2024/0005316 A1    Jan. 4, 2024

Related U.S. Application Data

(63) Continuation-in-part of application No. 17/332,375, filed on May 27, 2021, now Pat. No. 11,876,915.

(60) Provisional application No. 63/030,416, filed on May 27, 2020.

(51) Int. Cl.
| | |
|---|---|
| *H04L 29/06* | (2006.01) |
| *G06F 21/62* | (2013.01) |
| *G06F 21/64* | (2013.01) |
| *G06Q 20/36* | (2012.01) |
| *G06Q 20/38* | (2012.01) |
| *H04L 9/00* | (2022.01) |
| *H04L 9/08* | (2006.01) |
| *H04L 9/32* | (2006.01) |

(52) U.S. Cl.
CPC .......... *H04L 9/085* (2013.01); *G06F 21/6209* (2013.01); *G06F 21/64* (2013.01); *G06Q 20/3672* (2013.01); *G06Q 20/3674* (2013.01); *G06Q 20/3825* (2013.01); *G06Q 20/389* (2013.01); *H04L 9/3213* (2013.01); *H04L 9/50* (2022.05); *H04L 2209/46* (2013.01)

(58) Field of Classification Search
None
See application file for complete search history.

(56) References Cited

U.S. PATENT DOCUMENTS

| | | |
|---|---|---|
| 10,193,696 B2 | 1/2019 | Struttmann et al. |
| 11,194,837 B2 | 12/2021 | Vo et al. |
| 11,301,460 B2 | 4/2022 | Rich et al. |
| | (Continued) | |

FOREIGN PATENT DOCUMENTS

| | | | | |
|---|---|---|---|---|
| CN | 110024422 A | * | 7/2019 | ............. H04W 4/08 |
| WO | 2020092900 A2 | | 5/2020 | |

*Primary Examiner* — Andrew J Steinle
(74) *Attorney, Agent, or Firm* — NEO IP

(57) ABSTRACT

One of the drawbacks of Distributed Ledger Technology (DLT) is the conflation of authorization and authentication of transactions on a distributed ledger. The present invention includes a highly adaptable method and system for separating, but cryptographically linking, the authentication and authorization process of signing a transaction of a distributed ledger. The present invention facilitates group authority, common in corporate structures, for proposed transactions, voting models, and even workflow decision making. The present invention supports implementation of a variety of known authorization models into a decentralized network.

11 Claims, 26 Drawing Sheets

(56) References Cited

U.S. PATENT DOCUMENTS

| | | |
|---|---|---|
| 11,488,147 B2 * | 11/2022 | Sheng .................. G06Q 20/403 |
| 11,488,161 B2 | 11/2022 | Soundararajan et al. |
| 11,551,191 B2 | 1/2023 | McNamara et al. |
| 2014/0129457 A1 | 5/2014 | Peeler |
| 2017/0270493 A1 | 9/2017 | Lugli et al. |
| 2019/0080404 A1 | 3/2019 | Molinari et al. |
| 2019/0180311 A1 | 6/2019 | Chan et al. |
| 2019/0303623 A1 | 10/2019 | Reddy et al. |
| 2020/0089672 A1 | 3/2020 | Velisetti et al. |
| 2020/0349562 A1 | 11/2020 | Madhuram et al. |
| 2021/0042735 A1 | 2/2021 | Majidi et al. |
| 2021/0192501 A1 | 6/2021 | McNamara et al. |
| 2021/0377045 A1 | 12/2021 | Doney et al. |
| 2022/0006705 A1 | 1/2022 | Padmanabhan |
| 2022/0270080 A1 | 8/2022 | Yantis et al. |
| 2022/0271915 A1 | 8/2022 | Turner et al. |

\* cited by examiner

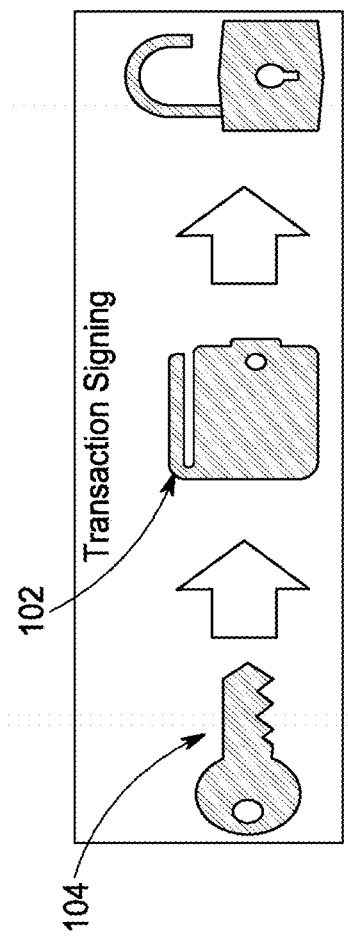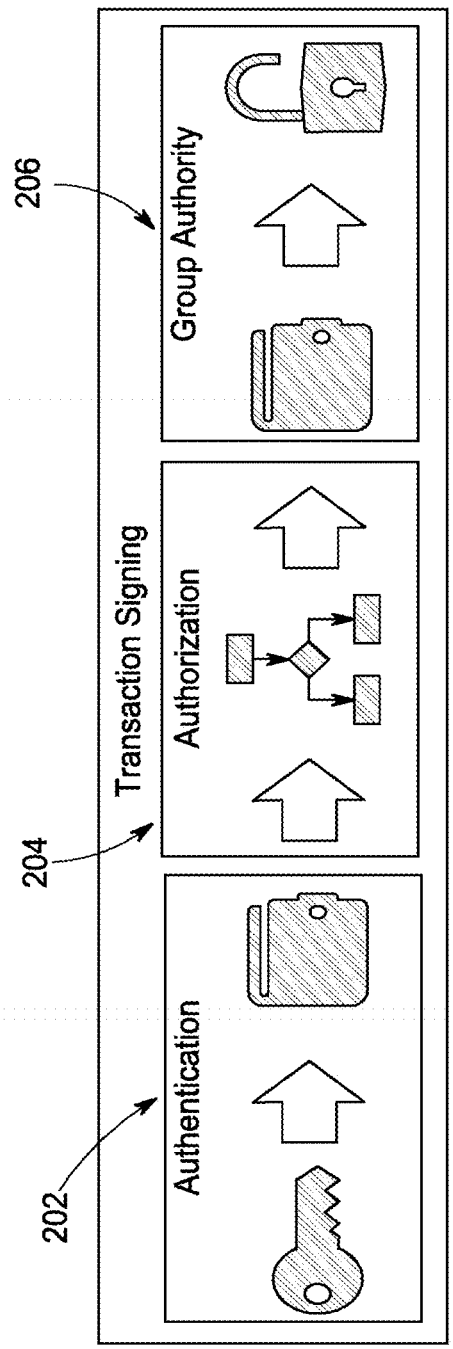

METHOD, APPARATUS, AND COMPUTER-READABLE MEDIUM FOR AUTHENTICATION AND AUTHORIZATION OF NETWORKED DATA TRANSACTIONS

CROSS REFERENCES TO RELATED APPLICATIONS

This application is related to and claims priority from the following U.S. patents and patent applications. This application is a continuation-in-part of U.S. application Ser. No. 17/332,375, filed May 27, 2021, which claims priority to U.S. Provisional Application No. 63/030,416 filed May 27, 2020 each of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to cryptographic methods for cryptographically linking separated authentication and authorization processes for data transactions on computing networks.

2. Description of the Prior Art

It is generally known in the prior art to provide a mechanism to separate the authorization and authentication process on a centralized system.

Prior art patent documents include the following:

U.S. Pat. No. 10,193,696 for Using a tree structure to segment and distribute records across one or more decentralized, acylic graphs of cryptographic hash points by inventors Struttmann, et al., filed Mar. 10, 2018 and issued Jan. 29, 2019, is directed to a process including: receiving with one or more processors, a first request to store a record from a computing entity; encoding, with one or more processors, the record in a first plurality of segments; arranging, with one or more processors, the first plurality of segments in respective content nodes of a first content graph, wherein at least some content nodes of the first content graph have two or more content edges of the first content graph pointing to two or more respective other content nodes of the first content graph; and storing, with one or more processors, the content nodes of the first content graph in a verification graph.

U.S. Pat. No. 11,488,147 for Computationally efficient transfer processing and auditing apparatuses, methods and systems by inventors Sheng, et al., filed Apr. 12, 2017 and issued Nov. 1, 2022, is directed to a Computationally Efficient Transfer Processing, Auditing, and Search Apparatuses, Methods and Systems ("SOCOACT") transforms smart contract request, crypto currency deposit request, crypto collateral deposit request, crypto currency transfer request, crypto collateral transfer request inputs via SOCOACT components into transaction confirmation outputs. Also, SOCOACT transforms transaction record inputs via SOCOACT components into matrix and list tuple outputs for computationally efficient auditing. A blockchain transaction data auditing apparatus comprises a blockchain recordation component, a matrix Conversion component, and a bloom filter component. The blockchain recordation component receives a plurality of transaction records for each of a plurality of transactions, each transaction record comprising a source address, a destination address, a transaction amount and a timestamp of a transaction; the source address comprising a source wallet address corresponding to a source digital wallet, and the destination address comprising a destination wallet address corresponding to a destination virtual currency wallet; verifies that the transaction amount is available in the source virtual currency wallet; and when the transaction amount is available, cryptographically records the transaction in a blockchain comprising a plurality of hashes of transaction records. The Bloom Filter component receives the source address and the destination address, hashes the source address using a Bloom Filter to generate a source wallet address, and hashes the destination address using the Bloom Filter to generate a destination wallet address. The Matrix Conversion component adds the source wallet address as a first row and a column entry to a stored distance matrix representing the plurality of transactions, adds the destination wallet address as a second row and column entry to the stored distance matrix representing the plurality of transactions, adds the transaction amount and the timestamp as an entry to the row corresponding to the source wallet address and the column corresponding to the destination wallet address; and generate a list representation of the matrix, where each entry in the list comprises a tuple having the source wallet address, the destination wallet address, the transaction amount and the timestamp.

U.S. Pat. No. 11,488,161 for Systems and methods for providing transaction provenance of off-chain transactions using distributed ledger transactions with secured representations of distributed ledger addresses of transacting parties by inventors Soundararajan, et al., filed Jul. 31, 2018 and issued Nov. 1, 2022, is directed to proving and creating on a distributed ledger a verifiable transaction record of a transaction between a user associated with user device and an agent associated with agent system, where the identities of the user and agent are hidden.

U.S. Pat. No. 11,194,837 for Blockchain implementing cross-chain transactions by inventors Vo, et al., filed May 1, 2018 and issued Dec. 7, 2021, is directed to receiving a request to execute a cross-chain transaction, identifying disparate locations of two or more different blockchains that have stored therein data for the cross-chain transaction, retrieving data from data blocks of the two or more different blockchains, respectively, based on the identified disparate locations, executing the cross-chain transaction which takes the retrieved data from the two or more different blockchains as inputs to generate a cross-chain result, and storing the cross-chain result via a data block of a distributed ledger.

WIPO Publication No. 2020/092900 for A tokenization platform by inventors Yantis, et al., filed Nov. 1, 2019 and published May 7, 2020, is directed to Systems, methods, platforms, and devices that generate, store, transact, transfer, exchange, and/or otherwise process digital tokens. Systems, methods, platforms, and devices obtain an identifier for an item that includes a set of item attributes, generate a digital token including a set of digital attributes that correspond to the set of item attributes, and cryptographically link the digital token to one or more units of the item. The digital token may be transferred, exchanged, redeemed, or otherwise transacted, which provides both the flexibility and convenience of virtual item transactions and the reliability and value of physical item transactions.

U.S. Patent Publication No. 2021/0042735 for System and method for controlling an application programming interface endpoint for transferring funds by inventors Majidi, et al., filed Aug. 6, 2019 and published Feb. 11, 2021, is directed to a system and method for controlling anomalous access to tables. A call including a source token and a destination token is received from a caller. A first type of token and a first type of wallet corresponding to the source token are identified. A second type of token and a second type of wallet corresponding to the destination token are further identified. A transaction is determined based on the first type of token, the first type of wallet, the second type of token, and the second type of wallet. A response quote is sent to the caller. The response quote includes details about the transaction and a request for confirmation.

U.S. Pat. No. 11,301,460 for Platform for creating and using actionable non-fungible tokens (KNFT) by inventors Rich, et al., filed Jan. 23, 2020 and issued Apr. 12, 2022, is directed to a distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector. A blockchain proxy server may be operatively connected to the KNFT application server and to a distributed blockchain ledger. Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT.

U.S. Patent Publication No. 2021/0192501 for Network computing system implementing on-demand liquidity to facilitate direct cross-medium transactions by inventors McNamara, et al., filed Feb. 21, 2020 and published Jun. 24, 2021, is directed to a computing system that can provide on-demand liquidity for cross-medium transactions using direct wallet-to-wallet transfers of digital currency. The system can acquire exchange rate information from multiple sources and generate a guaranteed exchange rate and trade instructions to the originating and recipient clients to execute the transaction.

U.S. Pat. No. 11,551,191 for Network computing system executing programmatic adapters to implement asynchronous communications by inventors McNamara, et al., filed Jan. 25, 2021 and issued Jan. 10, 2023, is directed to a computing system that can establish asynchronous network communications with exchanges to facilitate cross-medium transactions between originating and recipient clients. Such communications can result in filtering out errant responses that would otherwise cause an open transaction to fail.

U.S. Patent Publication No. 2022/0270080 for Authenticating physical items in a tokenization workflow by inventors Yantis, et al., filed May 13, 2022 and published Aug. 25, 2022, is directed to methods for authenticating items in part of a tokenization workflow. In embodiments, the method includes receiving a photograph of, and information relating to, an item, and generating a virtual representation of the item. The item may be authenticated by making an authentication request via a portal to subject-matter authentication experts, wherein the portal displays the virtual representation of the item in the portal. An authentication report may be received from the experts, and a non-fungible digital token having a unique token identifier may be generated. The non-fungible token may be cryptographically linked to the virtual representation of the item on a cryptographic ledger and ownership data of the non-fungible token is updated to associate an account of an owner of the item with the digital token on the cryptographic ledger.

SUMMARY OF THE INVENTION

The present invention relates to cryptographic methods for cryptographically linking separated authentication and authorization processes for data transactions on computing networks.

It is an object of this invention to separate, but cryptographically link, the authentication and authorization process for transactions on a decentralized network.

In one embodiment, the present invention includes a method for separating authentication and authorization of a transaction on a Distributed Ledger Technology (DLT) including: an actor initiating a transaction on the DLT to exercise the authority of an entity; authenticating the actor; creating an access token including a cryptographic component needed to sign the transaction on the DLT, symmetrically encrypting the access token with a shared key, fragmenting the shared key to produce a plurality of key fragments, and disseminating the plurality of key fragments throughout an authority structure of the entity; the actor acquiring the plurality of key fragments from the entity's authority structure; assembling the shared key with the plurality of key fragments; decrypting the access token with the shared key; verifying a right of the actor to execute the transaction on behalf of the entity evidenced by the decrypted access token; executing the transaction on the DLT through a signed transaction using the cryptographic component of the access token; and publishing the transaction to the DLT.

In another embodiment, the present invention includes a method for separating authentication and authorization for consensus voting of a transaction on a Distributed Ledger Technology (DLT) including: an actor initiating a transaction on the DLT to exercise the authority of an entity; authenticating the actor; creating an access token including a cryptographic component needed to sign the transaction on the DLT, symmetrically encrypting the access token with a shared key, fragmenting the shared key to produce a plurality of key fragments, and disseminating the plurality of key fragments throughout an authority structure of the entity; representing the authority structure of the entity through a consensus smart contract; wherein the consensus smart contract initiates an election of the transaction; wherein the consensus smart contract collects votes of the transaction representative of the authority structure of the entity; wherein the votes are transfers of fungible tokens including a key fragment of the plurality of key fragments to a digital wallet associated with the consensus smart contract; the consensus smart contract tallying the fungible tokens, acquiring the plurality of key fragments, and determining that the transaction has the authority of the entity; wherein the tallying of the fungible tokens is proportional to a voting power of the fungible tokens; assembling the shared key with the plurality of key fragments and decrypting the access token with the shared key; executing the transaction on the DLT through a signed transaction using the cryptographic component of the access token; and publishing the transaction to the DLT.

In yet another embodiment, the present invention includes a system for separating authorization and authentication for decentralized workflow management including: a decentralized workflow engine including a processor, a memory, and at least one smart contract executable on a Distributed Ledger Technology (DLT); wherein the decentralized workflow engine includes a workitem registry operable to mint a workitem Non-Fungible Token (NFT), a task registry operable to store a plurality of tasks associated with a workflow, and a route registry operable to store a plurality of routes connecting the plurality of tasks associated with the workflow representing an authority structure of an entity; wherein the decentralized workflow engine is operable to receive a request for a transaction on the DLT to exercise the authority of the entity and route the request to the workitem registry upon authentication of an actor associated with the request; wherein the workitem registry is operable to mint a workitem NFT associated with the request; wherein the decentralized workflow engine is operable to create an access token including a cryptographic component needed to sign the transaction on the DLT, symmetrically encrypt the access token with a shared key, fragment the shared key to produce a plurality of key fragments, and disseminate the plurality of key fragments throughout the authority structure of the entity; wherein the decentralized workflow engine is operable to route the workitem through the plurality of tasks associated with the workflow upon determination of authorization of each task of the plurality of tasks; wherein the authorization of each task is represented by a state change of the workitem on the DLT; wherein the state change of the workitem includes a key fragment of the plurality of key fragments; wherein the decentralized workflow engine is operable to verify the right to execute the transaction on behalf of the entity evidenced by acquiring the plurality of key fragments through the state change of the workitem; wherein the decentralized workflow engine is operable to assemble the shared key with the plurality of key fragments and decrypt the access token; wherein the decentralized workflow engine is operable to execute the transaction on the DLT through a signed transaction using the cryptographic component of the access token; and wherein the decentralized workflow engine is operable to publish the transaction on the DLT.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1 illustrates a conventional Distributed Ledger Technology (DLT) transaction.

FIG. 2*a* illustrates a separation of the authentication and authorization process for a transaction executed on a DLT according to one embodiment of the present invention.

DETAILED DESCRIPTION

Figure 2B:
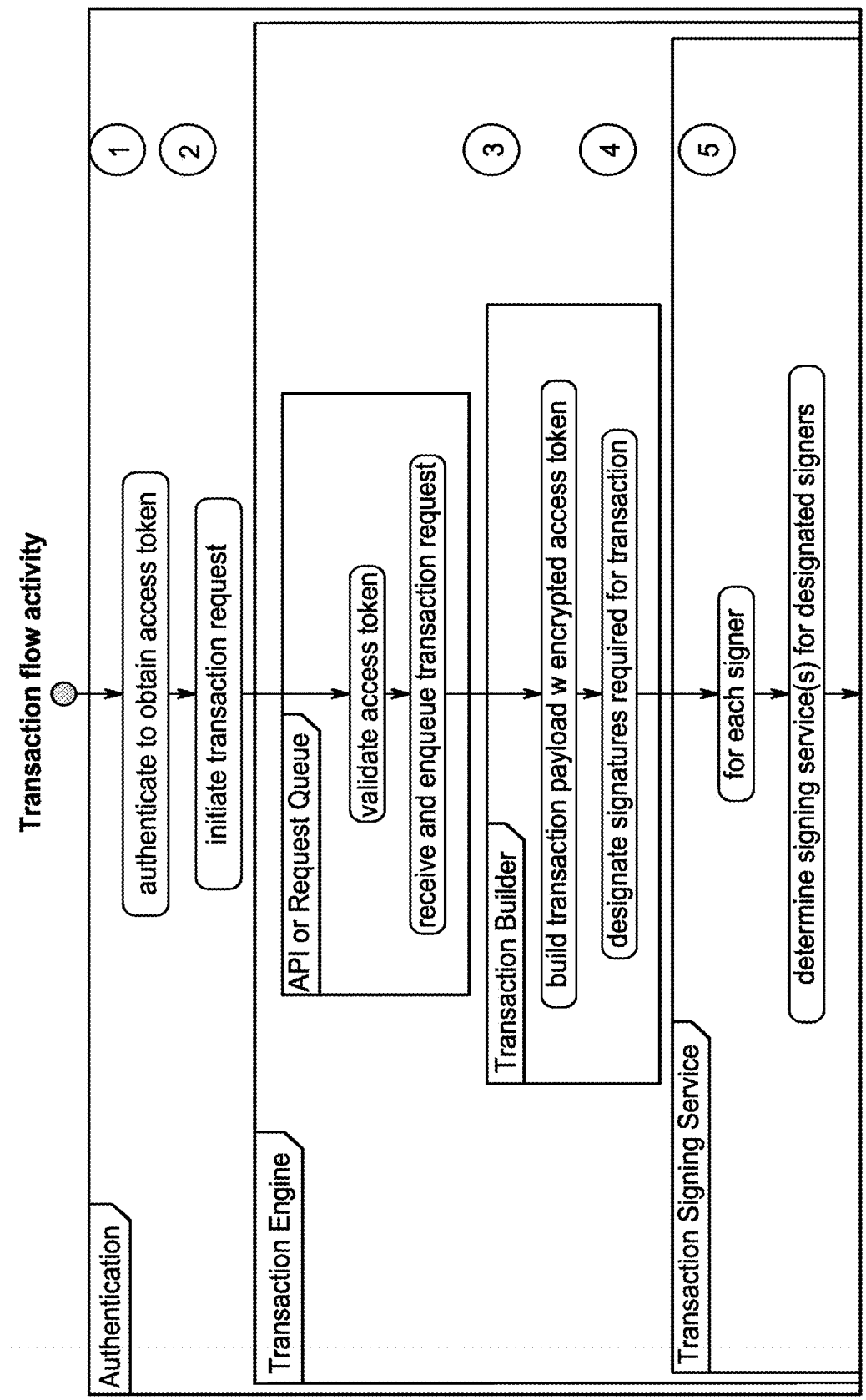
FIG. 2*b* illustrates a flow diagram of cryptographically linking authentication and authorization processes according to one embodiment of the present invention.

The present invention is generally directed to cryptographic methods for cryptographically linking separated authentication and authorization processes for data transactions on computing networks.

In one embodiment, the present invention includes a method for separating authentication and authorization of a transaction on a Distributed Ledger Technology (DLT) including: an actor initiating a transaction on the DLT to exercise the authority of an entity; authenticating the actor; creating an access token including a cryptographic component needed to sign the transaction on the DLT, symmetrically encrypting the access token with a shared key, fragmenting the shared key to produce a plurality of key fragments, and disseminating the plurality of key fragments throughout an authority structure of the entity; the actor acquiring the plurality of key fragments from the entity's authority structure; assembling the shared key with the plurality of key fragments; decrypting the access token with the shared key; verifying a right of the actor to execute the transaction on behalf of the entity evidenced by the decrypted access token; executing the transaction on the DLT through a signed transaction using the cryptographic component of the access token; and publishing the transaction to the DLT.

In another embodiment, the present invention includes a method for separating authentication and authorization for consensus voting of a transaction on a Distributed Ledger Technology (DLT) including: an actor initiating a transaction on the DLT to exercise the authority of an entity; authenticating the actor; creating an access token including a cryptographic component needed to sign the transaction on the DLT, symmetrically encrypting the access token with a shared key, fragmenting the shared key to produce a plurality of key fragments, and disseminating the plurality of key fragments throughout an authority structure of the entity; representing the authority structure of the entity through a consensus smart contract; wherein the consensus smart contract initiates an election of the transaction; wherein the consensus smart contract collects votes of the transaction representative of the authority structure of the entity; wherein the votes are transfers of fungible tokens including a key fragment of the plurality of key fragments to a digital wallet associated with the consensus smart contract; the consensus smart contract tallying the fungible tokens, acquiring the plurality of key fragments, and determining that the transaction has the authority of the entity; wherein the tallying of the fungible tokens is proportional to a voting power of the fungible tokens; assembling the shared key with the plurality of key fragments and decrypting the access token with the shared key; executing the transaction on the DLT through a signed transaction using the cryptographic component of the access token; and publishing the transaction to the DLT.

In yet another embodiment, the present invention includes a system for separating authorization and authentication for decentralized workflow management including: a decentralized workflow engine including a processor, a memory, and at least one smart contract executable on a Distributed Ledger Technology (DLT); wherein the decentralized workflow engine includes a workitem registry operable to mint a workitem Non-Fungible Token (NFT), a task registry operable to store a plurality of tasks associated with a workflow, and a route registry operable to store a plurality of routes connecting the plurality of tasks associated with the workflow representing an authority structure of an entity; wherein the decentralized workflow engine is operable to receive a request for a transaction on the DLT to exercise the authority of the entity and route the request to the workitem registry upon authentication of an actor associated with the request; wherein the workitem registry is operable to mint a workitem NFT associated with the request; wherein the decentralized workflow engine is operable to create an access token including a cryptographic component needed to sign the transaction on the DLT, symmetrically encrypt the access token with a shared key, fragment the shared key to produce a plurality of key fragments, and disseminate the plurality of key fragments throughout the authority structure of the entity; wherein the decentralized workflow engine is operable to route the workitem through the plurality of tasks associated with the workflow upon determination of authorization of each task of the plurality of tasks; wherein the authorization of each task is represented by a state change of the workitem on the DLT; wherein the state change of the workitem includes a key fragment of the plurality of key fragments; wherein the decentralized workflow engine is operable to verify the right to execute the transaction on behalf of the entity evidenced by acquiring the plurality of key fragments through the state change of the workitem; wherein the decentralized workflow engine is operable to assemble the shared key with the plurality of key fragments and decrypt the access token; wherein the decentralized workflow engine is operable to execute the transaction on the DLT through a signed transaction using the cryptographic component of the access token; and wherein the decentralized workflow engine is operable to publish the transaction on the DLT.

None of the prior art discloses a system that separates, but cryptographically links, the authorization and authentication process for transactions on a decentralized network.

Distributed Ledger Technologies (DLTs) (also referred to as "decentralized networks"), such as blockchain networks, are designed to be trustless and pseudonymous. Public and private key combinations are used to demonstrate the authority to operate a network address, known as a "wallet," and the data/value it contains. This allows execution authority to be decentralized, does not require verification of the party executing the transaction, and does not require additional intermediation. Decentralized execution authority is one of the most powerful and compelling features of DLTs. The most recognizable and common demonstration of authority on DLT networks is when an individual signs a transaction with a private key to send value (e.g., digital tokens) from their wallet to a wallet controlled by another party. This contrasts with traditional banking ledger technologies (relational database technologies or newer NoSQL systems) which tightly couple the intermediary business logic with the mechanisms for authenticating and authorizing clients. By decoupling authentication processes from business logic (which is often encapsulated in "smart contracts"), DLTs promise innovative user experiences and financial products.

However, data transactions are typically performed under the authority of an entity or authorized through a process rather than an individual. The authority to perform certain functions or take certain actions are delegated by entities to individuals based on the rights and qualifications of the individuals. Sometimes, authority is delegated to other entities, who in turn, delegate authority to individuals. For example, a law firm, a Broker, or a transfer agent may be delegated authority to act on behalf of an entity. The respective Partner, Registered Principal or President may be authorized to act on behalf of such entities for specific purposes. Under most state corporation laws, and as further specified in a company's articles of incorporation and bylaws, the individual officers of a company are automatically delegated authority to perform certain types of functions. While the functions are performed under the authority of the entity, it is frequently natural persons and Non-Person Entities (NPE), such as machine processes, that perform the actions pursuant to authority delegated by the entity. This authority only resides in a context (within the scope of the entity) and is often temporary (e.g., as long as the individual is assigned to the entity). Enabling individuals to express authority delegated by an entity to perform a proposed task (e.g., sign a transaction), requires a separation of authentication (i.e., proper identification of an individual) and authorization (i.e., verification of the individual's right in the group context).

For example, the comptroller of an entity may have the authority, based on affiliation with a company's finance department, to originate (but usually not release) payments to external entities. Authority to perform this action might not extend outside the company (e.g., the comptroller might not have authority to originate payments for other companies), exists only for the time that the individual holds the position, and is often part of a multi-step process which may require approval or other tasks associated with approval of the proposed transaction.

In a group context, multiple parties may have the authority to make data transactions on behalf of the entity, such as operate the value owned by the entity. In a conventional DLT environment, authorizing multiple individuals to sign transactions requires providing access to the private key to every individual, which results in a breakdown of accountability (it is impossible to identify who actually performed the action). Furthermore, it increases the probability of a security breach due to theft or malice and provides no mechanism to remove the individual's ability to exercise the authority even if their affiliation is removed from the group. Once the private key is known, it has been compromised.

Unfortunately, reliance on public/private key transaction signing, such as in DLT environments, conflates two important concepts present in most corporate actions, authentication and authorization. Signing a transaction using a public/private key is used to both authenticate (ensure the actor is the owner of the public address) and authorize (demonstrate the right to perform a function) the signer. Since these concepts are conflated, many corporate structures and nuances essential to corporate functions cannot be executed over a decentralized network without sacrificing authentication (by sharing the key) or authorization (rights and roles of participants cannot be distinguished).

Role Based Access Control (RBAC) like Active Directory or Lightweight Directory Access Protocol (LDAP), and Access Control Lists (ACL) are conventional techniques for granting authority in an enterprise context. However, these authorization techniques depend on centrally administered identity management, role definitions, and infrastructure. This centralization results in challenging integrations with external enterprises and results in fragmentation of the financial services marketplace. Further, integrating these centralized mechanisms with a decentralized network presents significant technical challenges.

Other known mechanisms for providing authority in a multiparty (group/entity) context includes multi-signature wallets and Multi Party Computation (MPC) methods for expressions of authority. For both techniques, group authority structure is reflected in a flat structure enabling any member or combination of members of a group sign a transaction thereby expressing the authority of the group. While these models can be used in conjunction with the disclosed implementations, by themselves they lack flexibility in the management of the authority structures and provide no means to link complex corporate authority structures that may involve nested groups, sequential processes, or temporary authority to the individual proposing a transaction.

Additionally, these methods do not cryptographically bind third party authentication or authorization techniques with the on-chain (i.e., on a DLT) expression of authority in the context of a transaction. Disconnected authentication and authorization steps may be used, but the proposed transaction could be changed prior to execution undermining the integrity of the system.

Furthermore, these MPC and multi-sig methods do not present a framework by which the wide range of authorization systems and techniques can be incorporated in the cryptographic signing event or can be considered in the context of a proposed transaction.

In summary, the explicit centralization of conventional authorization processes creates a "walled garden," an artificial boundary based on a technical approach that undermines efficient collaboration with entities outside the enterprise. In a global financial system with many interconnected enterprises, "walled gardens" cause delays in trade settlement and reconciliation, result in massive inefficiency, and complicate compliance making oversight reactive instead of proactive. Additionally, centralization of authorization undermines one of the principal benefits of distributed ledger systems, decentralized expression of authority thus limiting the potential of the breakthrough technology. Without a method to integrate decentralized authentication to authorization in the transaction signing process, the ease of access and channel for rapid innovation afforded by DLTs are lost.

The disclosed implementations overcome the limitations noted above by including separate mechanisms for authentication and authorization in the cryptographic signing process within the context of a decentralized network environment. The term "authentication," as used herein, refers to any technique used to validate, directly or indirectly, a signer's identity. Examples of authentication include presenting a public and private key, a username and password, a wallet/secret, biometric techniques for identification, and other known techniques for authentication. The term "authorization," as used herein, refers to any technique used to verify the authority of an authenticated party and/or parties (using roles of an individual within an entity, a group within an entity, business processes or approval chains, LDAP or Active Directory groups, social media groups or friends list, and the like) to make a proposed state change (transaction).

Conventional DLTs do not separate authentication and authorization in cryptographic signing of transactions. However, the disclosed implementations provide a novel computer architecture, data model, system, processes, and algorithms for allowing cryptographically linked authentication processes and authorization processes to be accomplished as distinct steps within a decentralized environment by cryptographically linking each process in the context of a proposed transaction, considering each separately, and requiring each component to successfully approve (or sign) state change.

In one embodiment, the actor (i.e., the initiatory of the transaction such as an individual) is authenticated, proposes a transaction which must be authorized using a separate but cryptographically linked process to sign and initiate the transaction. Several implementations of the technique to link authentication and authorization (A&A) cryptographically are disclosed including: linking the A&A processes using an encrypted access token and key fragments required to decrypt the wallet's secret; assigning separate Multi-Party Computation (MPC) or multi-signature (multisig) approval rights to the authentication and authorization service linked by an encrypted access token; or implementing on-chain authorization for the authenticated signer using smart contract based authorization. For the latter, the authentication and authorization process are separated but linked by the signing context for transactions initiated directly within a decentralized environment. Alternatively, the linking can be accomplished by an access token (i.e., an object that specifies, directly or indirectly, the security context of the initiator of a process or thread generated by a trusted entity for network-initiated transactions). In one embodiment, the process involves encrypting the transaction signing secret with fragments representing the authentication, authorization, and other (if desired) processes. The disclosed embodiments provide for a transaction system having increased security and flexibility.

In one embodiment, the present invention includes a method for executing a data transaction on a decentralized computer network on behalf of an entity wherein an actor's right to conduct the transaction on behalf of the entity is determined by an actor authentication process which is cryptographically linked to, but separate from an entity authorization process, the method including: authenticating the actor; in response to authenticating the actor, creating a cryptographically signed data packet (access token) providing an actor ID, optionally an entity ID to represent context, an authenticating service ID to thereby establish a authentication context for the initiator of a transaction; verifying the authentication context to execute business logic including; formulating the proposed data transaction in the context of the entity and including, in certain embodiments the access token encrypted; authorizing the transaction using a separate authorization process by validating the authentication context, in certain embodiments by inspecting the included access token, and the right of the actor to perform the proposed transaction on behalf of the entity; executing the data transaction on behalf of the entity including signing the data transaction to provide cryptographic assurance of the completion of the authenticating step, the creating step, the verifying step, the defining step and the authorizing step; and recording the signed data transaction on a decentralized ledger of the decentralized computer network.

In another embodiment, the present invention includes a system for executing a data transaction on a decentralized computer network on behalf of an entity wherein an actor's right to conduct the transaction on behalf of the entity is determined is captured in a novel smart contract structure. A smart contract, i.e., executable code stored on a decentralized ledger, representing an entity and the encapsulated organizational structure and processes is linked, via smart contract proxy, to a smart contract wallet, that is, the a contract with the authority to conduct transactions on behalf of an entity, the wallet is activated by the actor by signing a proposed transaction (the signing the equivalent of authentication), and the transaction is authorized by encapsulated authorization processes for the entity, resulting in the execution of the proposed transaction on behalf of the entity.

In yet another embodiment, the present invention includes a method by which varying transaction signing processes (split key encryption, multi-party computation, multi-signature, etc) can be substituted to affect the cryptographic linking of separated authentication and authorization processes in the context of a proposed transaction. Authentication, transaction formulation, and authorization must occur in a cryptographically linked process to avoid the injection of malicious or mistaken elements undermining the integrity of each element.

In yet another embodiment, the present invention includes a method for injecting a wide range of authorization processes which can be used independently or in conjunction including authorizations based on complex business structures, elections and voting, configurable business processes and workflows, and editable policies.

In yet another embodiment, the present invention includes a computer readable media having instructions stored thereon which, when executed by a computer processor, cause the computer processor to carry out the method described above.

Referring now to the drawings in general, the illustrations are for the purpose of describing one or more preferred embodiments of the invention and are not intended to limit the invention thereto.

The disclosed embodiments provide a cryptographically secure model to extend traditional authorization approaches (RBAC and ACL) to provide seamless integration with decentralized environments such as distributed ledger technologies. Most DLT technologies use asymmetric encryption to sign transactions. This requires the signer to produce the public key (address) and private key (secret) in order to sign the transaction.

FIG. 1 illustrates a conventional DLT data transaction. Each DLT transaction is a state change authorized by an initiator who prepares a transaction 102 and signs it with a public key 104 (often referred to as a "wallet" or "address") that is derived from a private key before sending it to the network for execution. In conventional DLT systems, the signing action both authenticates the initiator as the owner of the address and authorizes the transaction.

In this straightforward model, the authentication and authorization models are synonymous. The model does not have the means to consider the nature of the transaction or the authority structures under which the transaction was executed when affecting a transaction on the network. So, while transformative in its simplicity, this basic approach undermines important tenets required to manage corporate value thereby minimizing the value of blockchain networks in corporate contexts. FIG. 1 illustrates the basic steps of transaction execution on a network (authentication, authorization, and transaction formulation/signing/publication). It shows these processes as inseparable as they are on basic blockchain transactions. In this disclosure, the basic pattern of this model will be split into cryptographically linked, but separated authentication and authorization steps and varied in a series of implementations as disclosed below.

As noted above, many financial transactions occur in a group context. For example, a company's employee uses corporate resources to purchase a computer. If effected via DLT, the value owned by the company would be stored as a data structure in a corporate wallet to support transactions to further corporate goals. To affect the desired transaction (purchasing a computer in this example), the employee needs be given the private key for the corporate address (an act that would compromise all value in the wallet) or consult with someone who had access to the private key. The party with access would need to validate the employee's identity, standing, and right to conduct the transaction before initiating the transaction. In any case the individual (or individuals) who have signing authority cannot reliability be separated from the authority, even if they leave the company since they have had access to the secret.

Furthermore, the authority structure can be separated from the signing of the transaction itself as authority may depend on the transaction. For example, the employee may have the authority to spend $1,000 on behalf of the company, but not $1,000,000. Any model which establishes authority separated from a signed (and therefore immutable) transaction runs the security risk (cyber or insider) of the transaction being modified after authority has been granted.

Scalable models to represent authority of an individual in a group context in a decentralized system require an implementation to decouple, while cryptographically linking, authentication of the initiator of a transaction from authorization of a proposed transaction in the context of group authority. This linking while decoupling authentication and transaction authorization has many applications outside of group contexts (for example, delegation of authority between individuals, authorization of Non-Person Entities (NPEs, [i.e., machine processes to act on behalf of a user]) that one of ordinary skill in the art will appreciate that the present invention can be adapted to even if not explicitly disclosed herein. As noted above, the disclosed embodiments include a cryptographic method to incorporate complex authorization structures in simple transaction signing methods permitting various authority structures to be expressed in group (or other) contexts within a decentralized computing platform.

FIG. 2a illustrates the separation of the authentication and authorization process for a transaction executed on a DLT according to one embodiment of the present invention. In one embodiment, at 202, the initiator is authenticated using a public and private key, login through a username and password, using biometrics or other similar methods known in the art. Then, a transaction is proposed, and a cryptographic component needed for transaction signing is released, as disclosed in detail below. In one embodiment at 204, an authorization of the proposed transaction in the context of the group (or other entity) is assessed, as disclosed in detail below. If authorized, the components needed to publish the transaction are present. Other required authorization processes, such as approval from an accounting system, may be injected in a similar manner. Once all cryptographic components are in place, a valid transaction is published with the required signature to execute on the DLT network, at 206, resulting in a transaction initiated under the group or entity's authority. If the initiator's authority is removed according to group processes, sufficient cryptographic elements cannot be produced to sign the transaction. Technical details of this process are disclosed below.

Figure 2C:
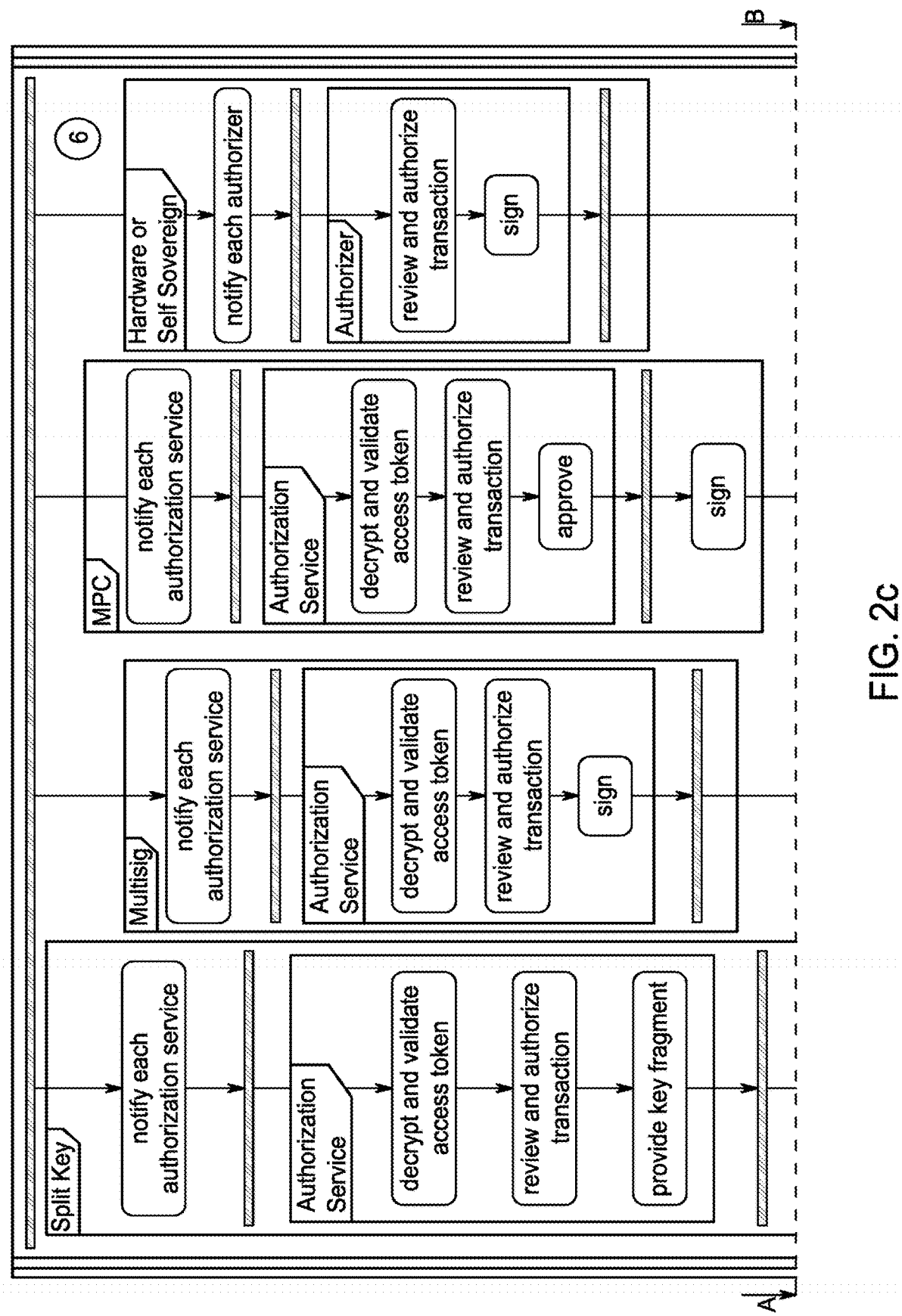
FIG. 2*c* is a continuation of the illustration of the flow diagram of cryptographically linking authentication and authorization processes according to one embodiment of the present invention.
Figure 2D:
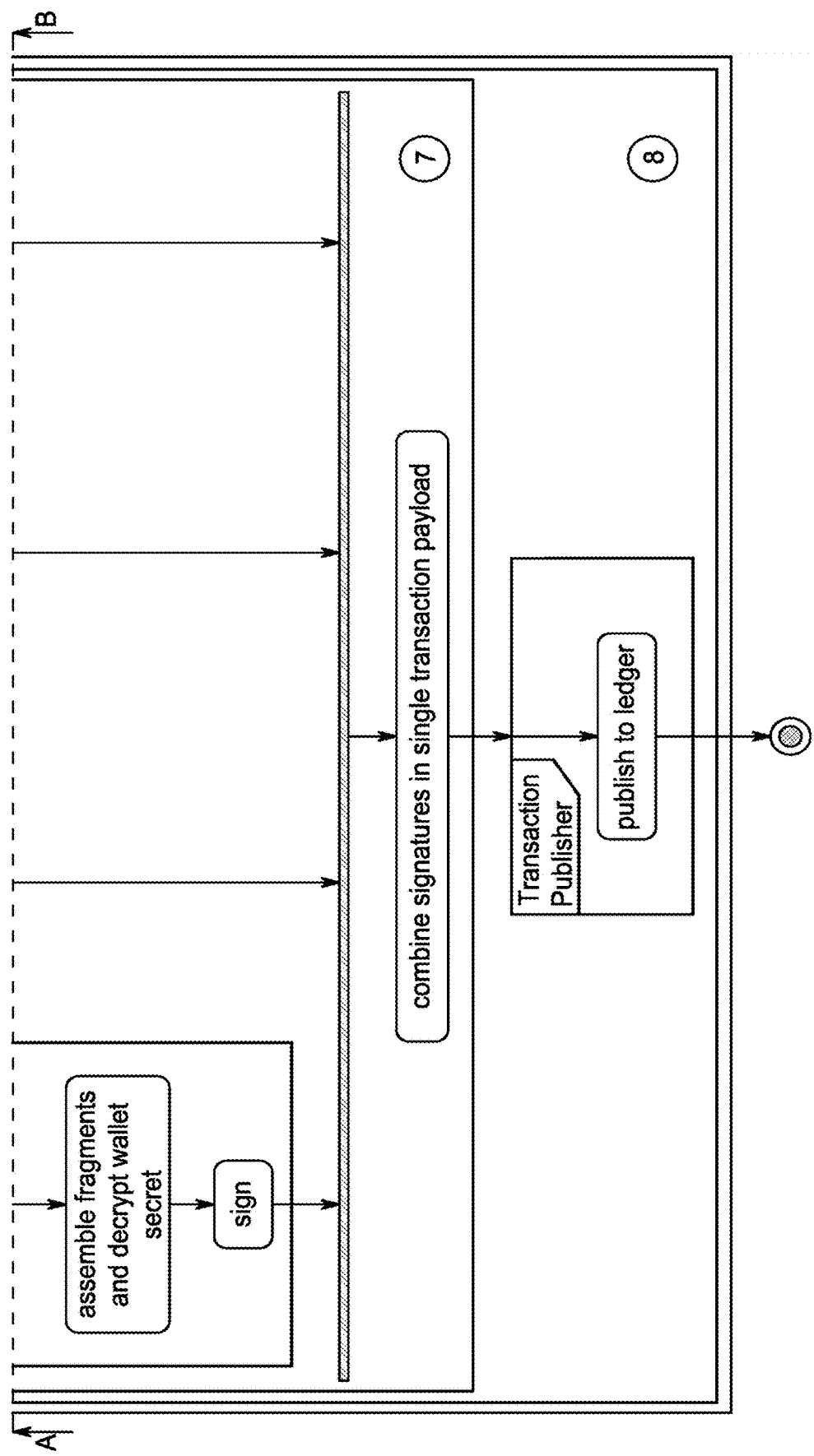
FIG. 2*d* is a continuation of the illustration of the flow diagram of cryptographically linking authentication and authorization processes according to one embodiment of the present invention.

FIGS. 2b-2d illustrates a process of cryptographically linking authentication and authorization according to one embodiment of the present invention. FIG. 2b illustrates a simplified process for cryptographically linking the authentication and authorization process, which is highly adaptable to the multiple embodiments of the present disclosure. Specific authentication models, authorization frameworks, and signing techniques are disclosed in detail in subsequent sections. In one embodiment, to exercise group authority (decrypt and operate a group wallet), the initiator, a natural person (or subgroup of persons), engages in a process that includes cryptographically linking authentication with one or more authorization processes. In one embodiment, a access token and a shared secret is used to bind the authentication and various authorization processes.

In one embodiment, at 1, an actor (e.g., an individual or a subgroup of individuals) is authenticated (through a conventional centralized mechanism, for example) and receives an access token that includes an associated expiration date. In one embodiment at 2, the actor initiates a transaction through a computer network request to an Application Programming Interface (API), event bus, or other compute process (represented as a Transaction Engine in FIG. 2b). The Transaction Engine validates the access token, encrypts it using a symmetric encryption technique (AES-256 or similar) using a shared secret. In one embodiment at 3, the Transaction Engine calls a process, Transaction Builder, to formulate a transaction using the specific syntax for the target distributed ledger (i.e., the coding language for the specific DLT that the transaction is occurring on). In one embodiment, the transaction payload includes the encrypted access token. In one embodiment, the Transaction Builder designates the required signatures for the desired transaction. At 4, the Transaction Engine validates the linkage between the access token and the designated signatories and initiates a request to a Transaction Signing Service (TSS). At 5, the TSS initiates an authorization process for each required signature as designated by the Transaction Builder. In one embodiment, each signer has a designated signature provider.

FIG. 2c highlights the different authorization process operable with the present invention. In one embodiment at 6, the signature provider executes the linked authorization process using Split Key Encryption, Multi-Party Computation, Multi-signature, and/or Self-sovereign signing techniques as discussed in the present application. Each implementation is disclosed in greater detail subsequently. As a general pattern the Signing Provider consults with the designated Authorization Provider for the signing wallet. FIG. 2d highlights the publishment of the proposed transaction to a DLT. In one embodiment at 7, the Authorization Service receives the proposed transaction payload, decrypts the payload to obtain and validate the access token, then reviews the proposed transaction by consulting one or more authorization processes (specific implementations disclosed later) to verify the initiator's right to affect the transaction on behalf of the entity and if approved, the service provides the needed components to enable the Provider to sign the transaction and return the signed transaction to the TSS. In one embodiment at 8, the TSS combines the required signatures into a single payload and returns to the Transaction Engine for publication to the target network or distributed ledger.

Each embodiment links the authority of a group to an individual, process, or empowered subgroup in the context of a signed transaction without providing the actor direct access to the group's source of authority within a decentralized network (i.e., the group's private key). The actor is only able to exercise the authority of the group so long as the assignment (e.g., membership, role, or process) is valid. In one embodiment, when an actor exercises authority, a delegation chain demonstrates how the authority was obtained and provides traceability as to which member exercised the authority under what context. Processes run by individuals or groups can be used to administer the delegation chain (membership list). In one embodiment, these authority structures exist off chain and/or on chain. In conventional decentralized networks, all actors acting under authority of an entity would have to have access to the entities secret key and there would be no evidence of which one of the actors signed any particular transaction.

In one embodiment, the separated authentication and authorization process is linked by encrypting the entity wallet's secret (i.e., the wallet's signing key) using symmetric encryption where the key used to encrypt and decrypt the wallet is composed of several fragments (i.e., split key encryption). In one embodiment, each and every (i.e., all) fragment is needed to decrypt the wallet secret. In one embodiment, not all fragments are needed to decrypt the wallet secret. In one embodiment, a majority of the fragments are needed to decrypt the wallet secret. In one embodiment, the symmetric encryption is the Advance Encryption Standard (AES)-256 and/or other similar symmetric encryption method. These fragments (or "key fragments") are assigned to the processes which are being linked, in this case authentication, transaction formulation, and authorization processes. Each process must contribute its fragment to produce the key needed to express the group's authority (i.e., sign and affect a transaction). Production of each fragment represents the group's authority to conduct a certain action (e.g., a transaction on a DLT).

In one embodiment, to separate the signing processes, the secret is encrypted using symmetric encryption. All (two or more) key fragments must be present in order to decrypt the secret used to sign the transaction based on the algorithm set forth below:

key'=SHA(authentication process fragment^authorization process fragment^other protection key(s))

EncryptedSecret=AES(Secret,key')

Where:
key' is formed by applying a hashing algorithm to 2 or more fragments,
SHA is the Secure Hashing Algorithm or similar hashing technique, and
AES is the Advanced Encryption Standard or similar symmetric encryption technique These key fragments are stored separately, with each fragment only accessible to its respective process, and provide a cryptographic linkage between the processes. In one embodiment, key encrypting keys link a process to its stored fragment.

EncryptedFragment=AES(process fragment,process key encrypting key)

In one embodiment, to decrypt the secret required to sign the transaction on behalf of the entity, all key fragments must be presented to recreate the key' (i.e., the wallet secret and/or private key). Therefore, each process must be completed independently in order to produce the fragments needed to decrypt the wallet secret, private key, and/or signing secret needed to complete the action (i.e., transaction on a DLT). This method ensures independent completion of the authentication and authorization process and enables a range of authorization methods to be used together or independently within a decentralized computing environment as described below.

To utilize the key fragment embodiment generalized above, the user (i.e., actor) authenticates (proof of identity) itself using well known "off-chain" methods (such as username/password, multi-factor, biometrics, etc.) and receive an access token (i.e., an off-chain cryptographically signed data packet) from the trusted authentication source. In one embodiment, the access token represents the authentication process. In one embodiment, the access token is used to propose a transaction through a system which validates the access token, formulates the transaction to be signed, symmetrically encrypts the access token with a shared secret with the authorization service (access context), formulates the proposed transaction, and provides a key fragment representing the source of the formulated transaction. Separately, an authorization service decrypts access context to obtain the access token using a shared secret, validates the access token, verifies the initiator's rights in the group context to perform the transaction, and if approved, provides a second fragment used to decrypt the secret used to sign the transaction. These fragments are combined along with other fragments as desired to provide proof of authentication and authorization in the context of the transaction signing. The access token represents authentication and the presence of the fragments represents authorization. In one embodiment, only a predetermined number of fragments are needed to decrypt the access token. In one embodiment, all the fragments are needed to decrypt the access token.

In one embodiment, the access token, tied to a user's credential, is only available in-session. In one embodiment, the initiator must be actively engaged to execute authority and cannot be impersonated. In one embodiment, encrypting keys used to encrypt fragments are "untouched by human hands" (i.e., not accessible to administrative individuals) by being stored in vaults that are generated at system implementation, and are only accessible through approval processes involving multiple independent actors. In one embodiment, access to the encrypting keys produces a unique alert and results in a key rotation once the system is restored.

Advantageously, this technique provides security benefits, separation of duties, split knowledge, and dual control. The unique structure of the disclosed embodiments provide additional benefits. For example, in one embodiment, identity and transaction components are physically separated and independently developed services, which reduces insider threat and attack vectors that involve a compromised system or theft of data. To further ensure separation, in one embodiment authorization and transaction formulation services are owned and hosted by independent entities.

Advantageously, linking authentication and authorization processes in the context of a proposed transaction enables a very powerful risk-based authentication model for decentralized transactions. For risk-based authentication, the level of authentication of an actor depends on the nature of the transaction being attempted. For example, if an actor proposes a $10 transaction, the authorization process may not require any extraordinary authentication technique (e.g., only requiring some of the key fragments described above). However, if the actor proposes a $1,000,000 transaction from a foreign country, the authorization system may require additional levels of authentication, such as biometrics, or even out of band approval. Without linking the authentication, transaction formulation, and authorization processes in a cryptographic context, scalable decentralized models for this workflow are challenging, fragile, and vulnerable to cyber-attack.

Figure 3:
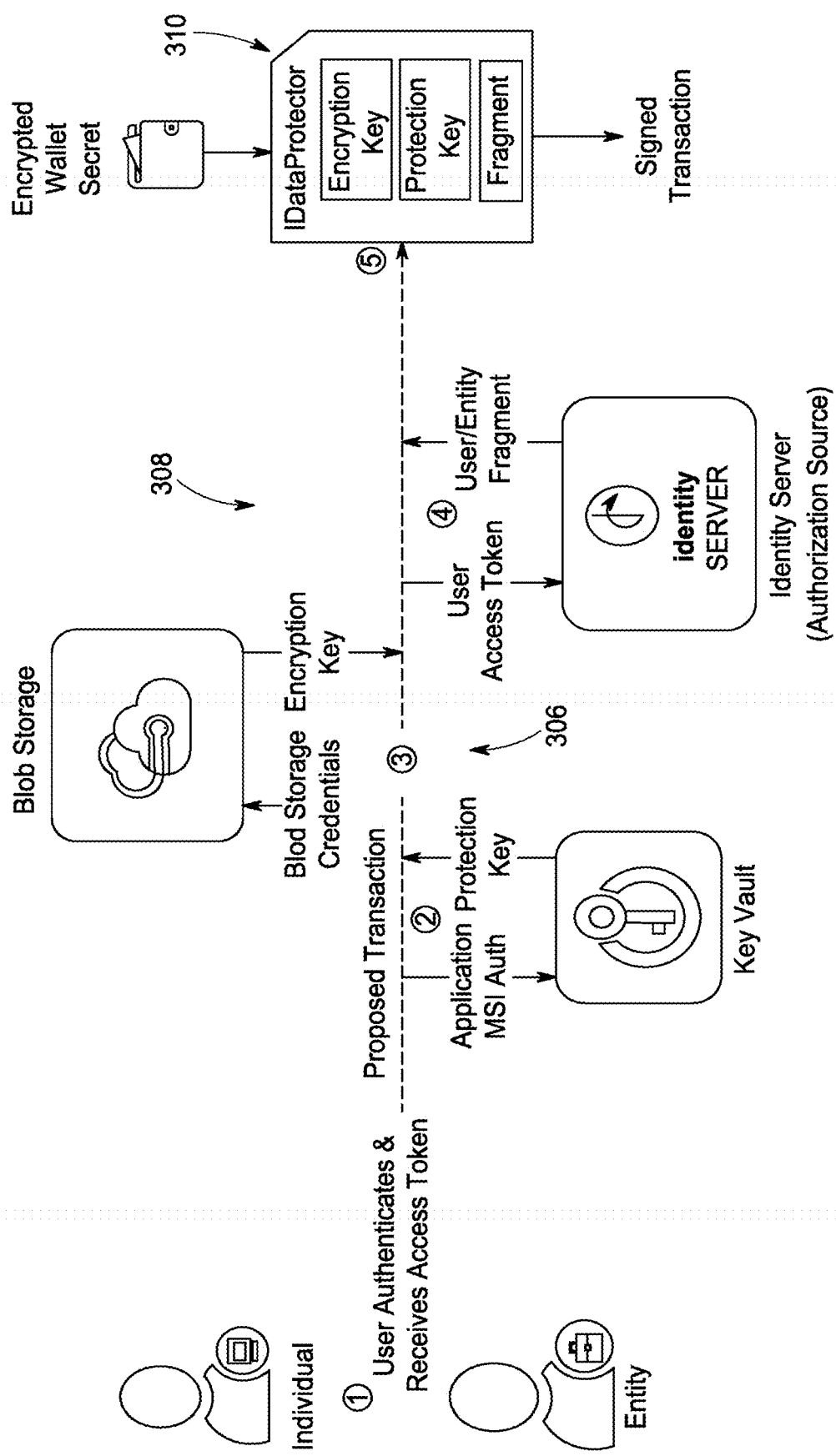
FIG. 3 illustrates an example process of a DLT transaction with separate authentication and authorization processes according to one embodiment of the present invention.

FIG. 3 illustrates an example process of a DLT transaction with separate authentication and authorization processes according to one embodiment of the present invention. In one embodiment, in order to exercise group authority (decrypt and operate a group wallet), a natural person (or subgroup of persons) must obtain at least 2 different key fragments including: 1) a Protection Key Fragment, which represents the authentication process; and 2) an Entity Key Fragment, which represents the authorization process.

In one embodiment, at step 1, an actor (e.g., an individual or a subgroup of individuals) is authenticated (through a conventional centralized mechanism or other authenticating mechanism) and receives an access token. In one embodiment the access token includes an associated expiration date, such that it is inoperable following the expiration date. In one embodiment at step 2, a transaction formulation process validates the access token. In one embodiment the transaction formulation process formulates the transaction, and provides a protection key fragment representing a successful authentication process to thereby accomplish authentication within the decentralized environment. In one embodiment at step 3, the user's credentials are stored and a user encryption key is generated. In one embodiment at step 4, an authorization service verifies the access token and determines the actor's right to act on behalf of the group. If authorized, an authorization (user/entity) fragment is provided. In one embodiment, additional processes are represented by providing additional key fragments. In one embodiment at step 5, a Transaction Signing Service (IDataProtector) assembles the fragments to decrypt the wallet's secret. The service signs the transaction using the wallet private key. In one embodiment, the wallet signing uses a single key, a multi-sig, MPC methods, and/or other conventional methods known in the art.

Figure 4A:
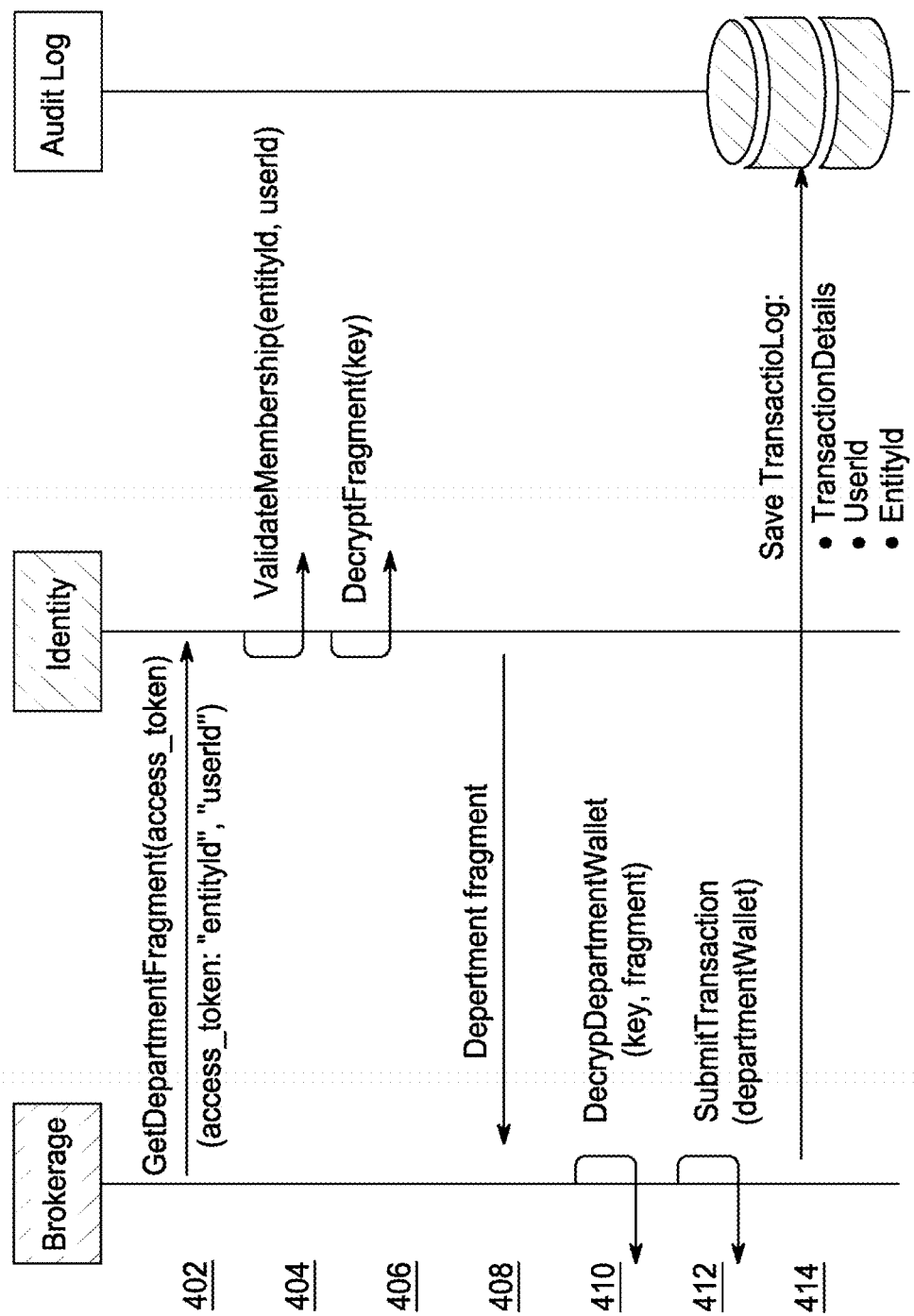
FIG. 4*a* illustrates a data flow diagram of messaging protocol according to one embodiment of the present invention.

FIG. 4a illustrates an architecture and messaging protocol of an example implementation according to one embodiment of the present invention. Specifically, FIG. 4a illustrates an example embodiment in which an individual (actor) signs a transaction as an agent of a brokerage (entity) after obtaining authority to operate a group (department in this example) wallet. At 402, after authenticating and receiving an expiring access token, the actor requests a department key fragment from an Identity Server by providing the access_token data structure to authorize the request. In one embodiment at 404, an Identity Server validates access_token, parses entityId and userId from the access_token data structure and validates that the user has permission to access a department key fragment. At 406, the Identity Server decrypts the department fragment using key encrypting key and, at 408, sends the decrypted department fragment to the actor. In one embodiment at 410, The Signing Key for the department wallet is decrypted using the Encryption Key, the Protection Key, and the Department Fragment and at 412, the transaction is submitted using the wallet and the decrypted secret. In one embodiment at 414, the signed transaction including an initiator and/or actor identifier is published to the DLT. Advantageously, the identifier enables an auditor to see who processed the transaction and under what authority (i.e., authentication and authorization)(e.g., "Initiator took Action on behalf of Department XYZ").

In one embodiment, Multi-Party Computation (MPC) is employed to separate the authentication and authorization processes involved in transaction signing. MPC is a subfield of cryptography with the goal of creating methods for parties to jointly compute a function of personal data inputs while keeping the inputs private. MPC is understood by one of ordinary skill in the art. In general, MPC techniques split transaction signing mathematically such that no party or process can produce the secret required to sign a transaction, but parties acting together as approvers can produces a signing authority. In one embodiment the present invention uses the cryptographic linkage property of MPC techniques to split the ability to affect a transaction between separated authentication and authorization processes using the novel process of the disclosure. In one embodiment, MPC transaction approval authority is split between multiple services. In one embodiment, one service, responsible for forming the proposed transaction, validates the initiator's authentication status by using an expiring access token produced by an authentication server (as described in the previous embodiment). Once validated, the service formulates the proposed transaction, encrypts the access token using symmetric encryption and a shared secret (access context), adds the access token to the transaction payload, and publishes the immutable payload with its approval to a transaction signing service (or other communication channel) for messaging to one or more authorization services (i.e., approvers). In one embodiment, a separate authorization service retrieves the transaction signing service message, decrypts the access context using the shared secret to obtain the access token, validates the access token and transaction source, checks whether the transaction is authorized using one or more processes and approves using the second MPC signature. In one embodiment, additional fragments are applied for further validation of the transaction. In one embodiment, the transaction is signed only if sufficient fragments are present.

Figure 4B:
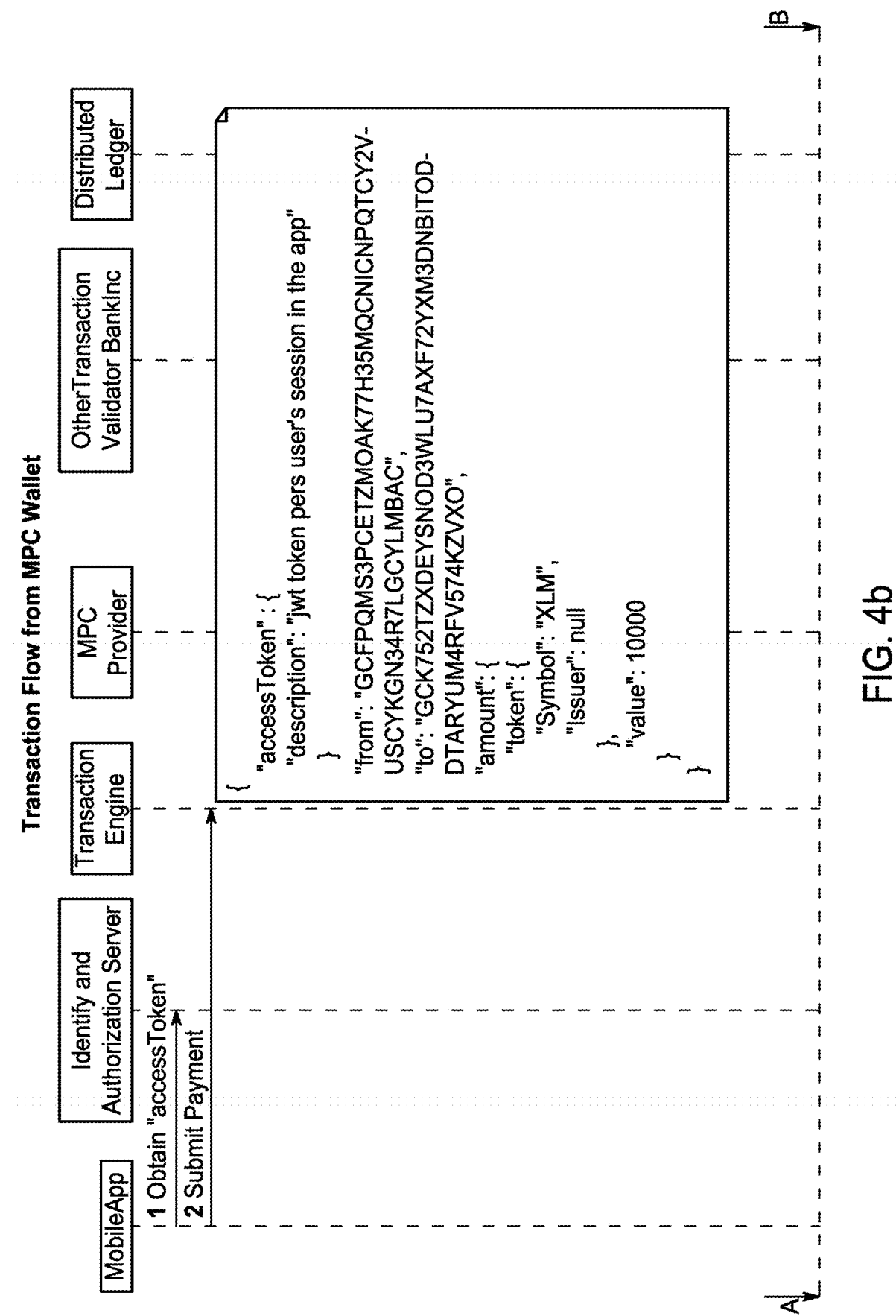
FIG. 4*b* illustrates a detailed process for information exchange between participants in a signing sequence according to one embodiment of the present invention.
Figure 4C:
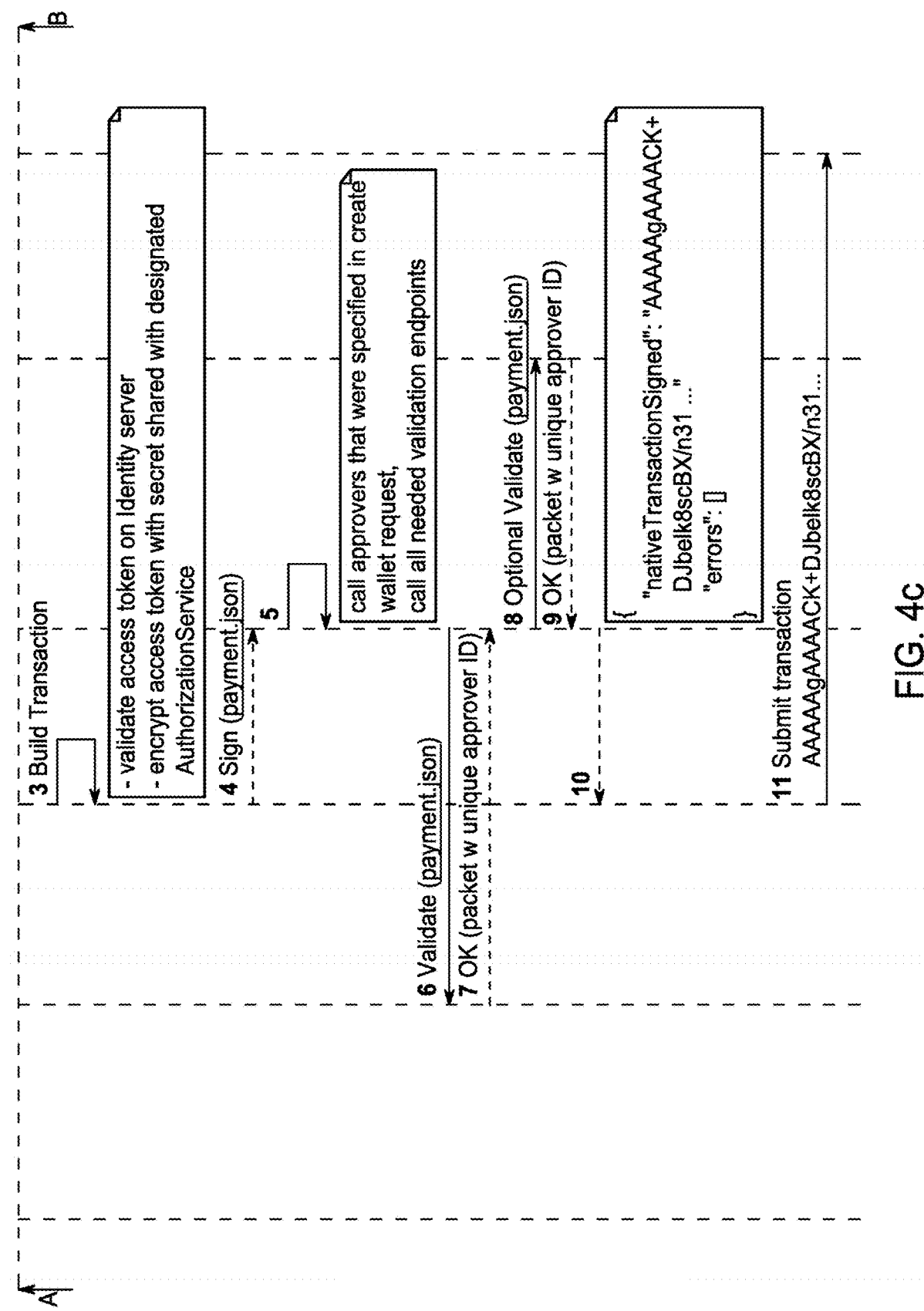
FIG. 4*c* is a continuation of the illustration of a detailed process for information exchange between participants in a signing sequence according to one embodiment of the present invention.

FIGS. 4b and 4c illustrate a detailed process for information exchange between participants in a signing sequence according to one embodiment of the present invention. In one embodiment, at step 1, the initiator (or actor) is authenticated via the identity and authorization service using a display device and obtains an access token. In one embodiment, the display device is a mobile device running a mobile application or "mobile app" operable to facilitate the process of the present invention. In one embodiment, at step 2, the initiator submits a proposed payment on behalf of the entity to the Transaction Engine (nominal payload illustrated in FIG. 4b). In one embodiment, at step 3, the Transaction Engine validates and encrypts the access token with a shared secret, and builds the payload for the target distributed ledger. In one embodiment, the payload includes the entity wallet and encrypted access token. In one embodiment at step 4, the Transaction Engine signs the transaction and submits to the MPC Provider (via a Transaction Signing Service). In one embodiment, at step 5, the MPC Provider notifies required approvers (containing authorization services). In one embodiment, at step 6, the Authorization Service decrypts and validates the access token using a shared secret and validates the initiator's right on behalf of the entity. In one embodiment, the initiator's right on behalf of the entity is determined by the presence of multiple key fragments. In one embodiment, at step 7, if the initiator's right is valid, the authorization server approves by providing an MPC signature. In one embodiment, at steps 8 and 9, other approval services are engaged using the same pattern. In one embodiment, the process for information exchange between participants does not include step 8 or 9 and proceeds directly to step 10. In one embodiment, at step 10, after all approvals are obtained, the signed transaction is returned to the transaction engine for publication to the network or distributed ledger (illustrated by step 11).

Figure 5:
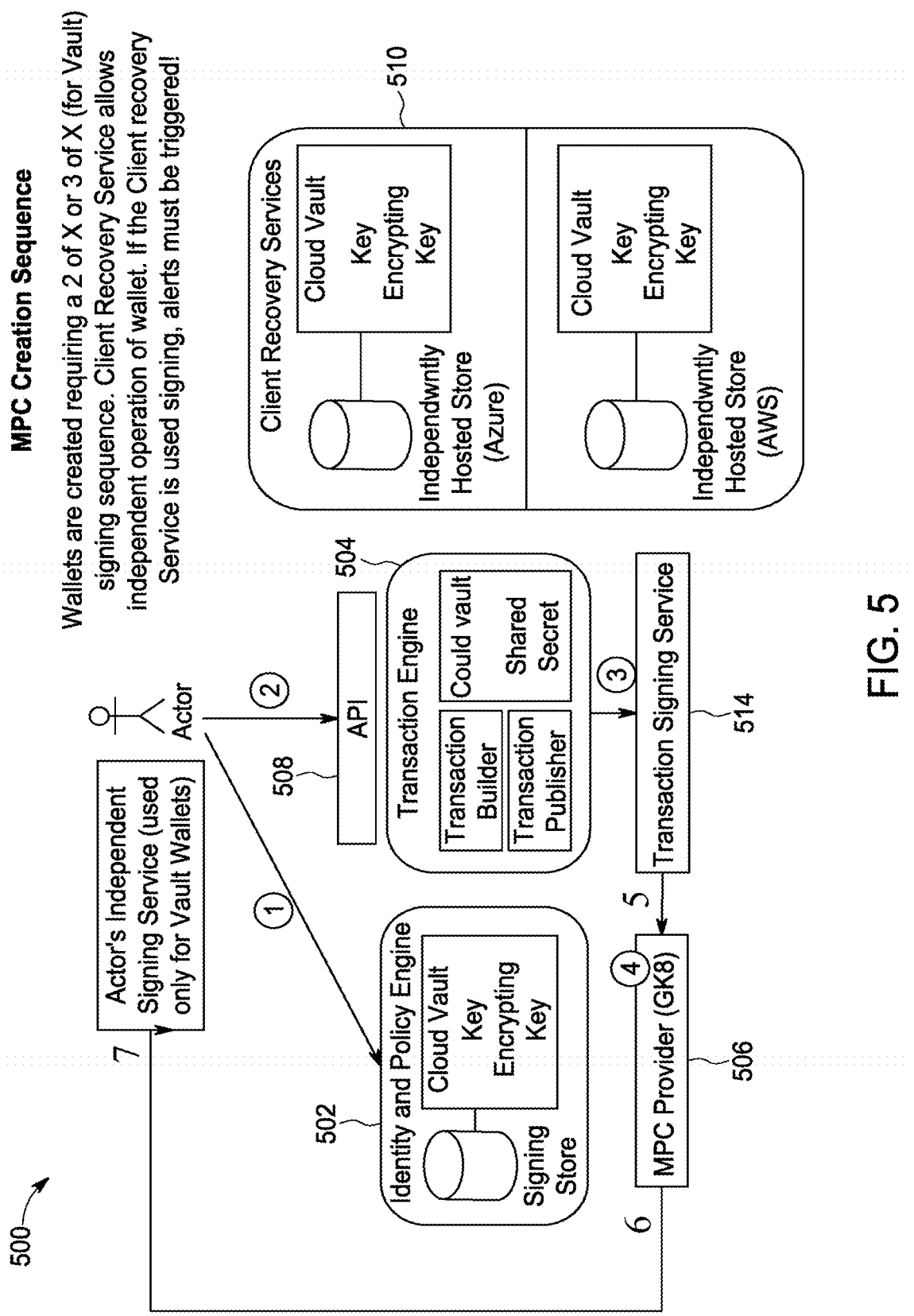
FIG. 5 illustrates an architecture and Multi-Party Computation (MPC) creation sequence according to one embodiment of the present invention.

In one embodiment, the present invention utilizes a Multi-Party Computation (MPC) to separate the authentication and authorization processes. FIG. 5 illustrates an architecture 500 and MPC creation sequence according to one embodiment of the present invention. In one embodiment, the architecture 500 includes Identity and Policy Engine 502, a Transaction Engine 504, MPC Provider 506, API Module 508, Client Recovery Services 510, and/or transaction signing service 514. In one embodiment, the architecture 500 is a computer architecture including computer modules operable to functionally communicate with one another to facilitate the steps of the authentication and authorization processes of the present invention. In one embodiment, the architecture 500 is a decentralized network including decentralized applications (i.e., software programs run on a DLT or Peer-to-Peer (P2P) network of computers instead of on a single computer. Each of the components of architecture 500 are described in greater detail below in connection with various operations of the disclosed embodiments. Client Recovery Services 510 enables independent operation of the wallets, as described below. In one embodiment, alerts are triggered to notify stakeholders of wallet operation. In one embodiment, the various wallets are "vault wallets" (i.e., hardware devices that serve to sign or approve a transaction). In one embodiment, the various wallets are provided as a service in a manner known to one of ordinary skill in the art (i.e., digital wallets, crypto wallets, etc.).

In one embodiment, at step 1, an actor logs in using a display device running an application via Identity Service to receiving an Access Token. In one embodiment, a mobile device running a mobile app is used for step 1 and subsequent steps requiring user input. In one embodiment, at step 2, the actor requests a transaction via the Transaction Engine API. In one embodiment, the request is made via a display device running a mobile app. In one embodiment at, step 2, the actor's Access Token is validated by the Transaction Engine. In one embodiment at step 3, the Transaction Engine builds the requested transaction for the proposed transaction in a schema required by the target DLT (i.e., the transaction payload). In one embodiment, at step 4, the Transaction Engine publishes the proposed transaction to the Transaction Signing Service. In one embodiment, the requested transaction includes the Access Token encrypted with a Shared Secret between the Transaction Engine and the desired Identity and Policy (i.e., Authorization) Engine. Note: different wallets may have different policy servers based on "host". In one embodiment, at step 5, for the designated wallet, the Transaction Signing Service publishes the transaction to the MPC Signing Service for the first approval. In one embodiment, the process illustrated by FIG. 5 includes other signing services, such as, multi-sig, self-signed or HSM, and/or split-key patterns. In one embodiment, at step 6, the MPC signing service requests approval from Authorization Service(s) (i.e., the Identity and Policy Engine). In one embodiment, at step 7, the Authorization Service decrypts and validates legitimacy of the Access Token. In one embodiment at step 7, the Authorization Service consults the Policy governing the transaction if the transaction is subject to a policy. In one embodiment, if authorized, the Authorization Service approves the transaction to meet a 2 of X signing standard (i.e., for multi-sig wallets where 2 out of a total of X signatures are needed to operate the wallet). In one embodiment, the Authorization Service is operable to approve and enforce multi-sig signing standards where the standard is, 2 of X, 3 of X, and/or any other similar combinations. In this embodiment, "X" represents an arbitrary number of the total signatures for a multi-sig signing standard. In one embodiment, where authorization fails, the reasons for authorization failure are logged with the denial. In one embodiment, the process of FIG. 5 is operable with vault wallets. In this embodiment at step 8, the Actor approves the transaction using an Independent Approval Service. In one embodiment, a display device is used to approve the transaction using an Independent Approval Service. In one embodiment, the process of FIG. 5 is operable to utilize other approval services as required for specific applications. In one embodiment, at step 9, once required approvals are obtained, the proposed transaction is signed and returned to the Transaction Signing Service. In one embodiment at step 10, the signed transaction is sent to the Transaction Engine for publication and, at step 11, the signed transaction is published to the DLT. In one embodiment the transaction is published to a blockchain ledger, Ethereum ledger, private ledger, and/or other similar DLT known in the art.

In one embodiment, the sequence of FIG. 5 is operable with vault wallets. In this embodiment, the Actor's Independent Signing service is registered with the Transaction signing service. In one embodiment, the independent signing service and the transaction signing service acknowledges wallet creation. In one embodiment, the Group wallet (i.e., a vault wallet requiring multiple signatures) is available for use from a mobile app by parties who have been assigned rights to the group. In one embodiment, vault wallets are signed using a 2 of X or a 3 of X signing sequence. In one embodiment, both Transaction Engine and Identity Policy Engine are required to sign to initiate a transaction. Policies are enforced by a signature of an Identity/Policy Engine.

Figure 6:
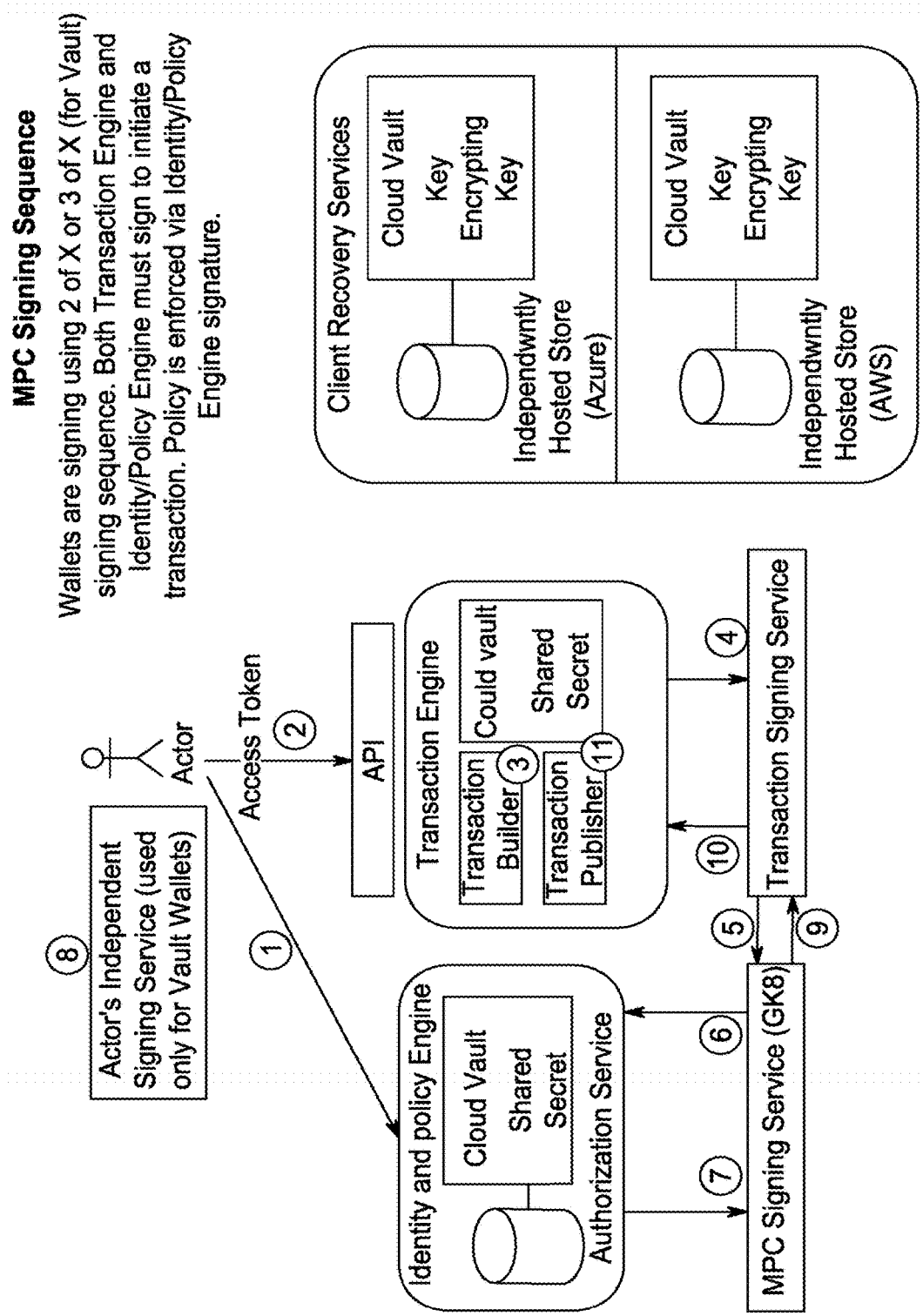
FIG. 6 illustrates an MPC signing sequence according to one embodiment of the present invention

FIG. 6 illustrates an MPC signing sequence according to one embodiment of the present invention. In one embodiment, at step 1, the actor receives an Access Token via the Identity Service. In one embodiment, the actor logs in to a platform using a mobile app via Identity Service to receive the Access Token. In one embodiment, at step 2, the user requests a transaction via the API of the Transaction Engine. In one embodiment, the request is facilitated via a display device running a mobile app. In one embodiment, the user's Access Token is validated by the transaction engine. In one embodiment, at step 3, the Transaction Engine initiates a transaction event via the MPC provider, encrypts the Access Token using symmetric encryption and a shared secret, then publishes the event including the proposed transaction, the encrypted access token, and other metadata as desired to an Transaction signing service, as illustrated by step 4. In one embodiment, the Access Token is encrypted using Advanced Encryption Standard AES-256 or other similar symmetric encryption method known in the art. Step 3 and 4 represent the authentication and transaction formulation process. In one embodiment, at step 5, the Identity Service of the Identity and Policy Engine detects a signing event from the Transaction signing service and, in response, validates the legitimacy of the Access Token, decrypts the transaction payload using the shared secret included in the access token, validates the authority of initiator of the transaction in the context of the group, and signs the transaction to meet the requisite vault wallet signing sequence (e.g., 2 of X standard). In one embodiment, for vault wallets, the user is required to sign the transaction using Independent Signing Service (e.g., on a display device). A Vault Wallet is a wallet using the disclosed transaction signing pattern that requires an additional out of band approval by the Actor or another party independent of the authentication and authorization process. This signing may involve a known hardware-based signing mechanism.

Figure 7:
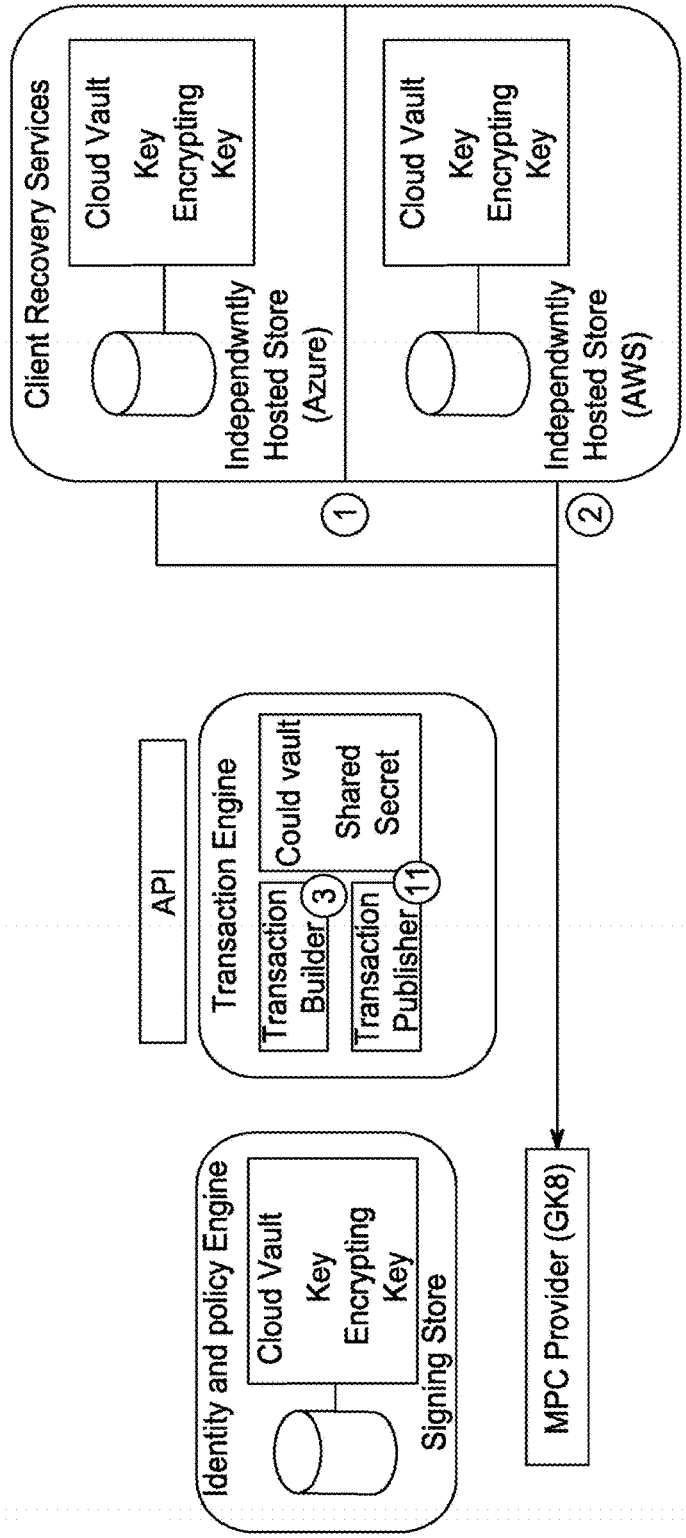
FIG. 7 illustrates an MPC recovery sequence, accomplished by client recovery services according to one embodiment of the present invention.

FIG. 7 illustrates an MPC recovery sequence, accomplished by Client Recovery Services according to one embodiment of the present invention. In one embodiment, the platform enables Wallet recovery using a 2 of X or a 3 of X signing sequence. In one embodiment, a transaction is initiated without user participation where each Client Recovery Service signs the transaction. In one embodiment, recovery does not require Identity or Transaction Engine operations for business continuity by bypassing the authentication and authorization techniques disclosed herein. In one embodiment utilizing vault wallets, the actor is required to sign proposed transactions using the Independent Signing Service. In one embodiment where one or both of the Client Recovery Service nodes fail or are lost, the Engine signers are used for MPC recovery. In one embodiment, at step 1, either node in the Client Recovery Service initiates a recovery transaction. In one embodiment, the recovery transaction includes delivery of value to a new address. In one embodiment at step 2, the independent node validates and signs the recovery transaction. In one embodiment where vault wallets are utilized, the Actor signs the transaction using an Independent Signing Service (represented by 3 of FIG. 7).

Advantageously, the present invention enables signing authority for a wallet to be delegated to a (NPE). As a nonlimiting example, the present invention is able to be used for scheduled payments, bridge transactions (e.g., hypothecation), or process-based transactions (e.g., functions of a custody wallet connected to the internet).

Figure 8:
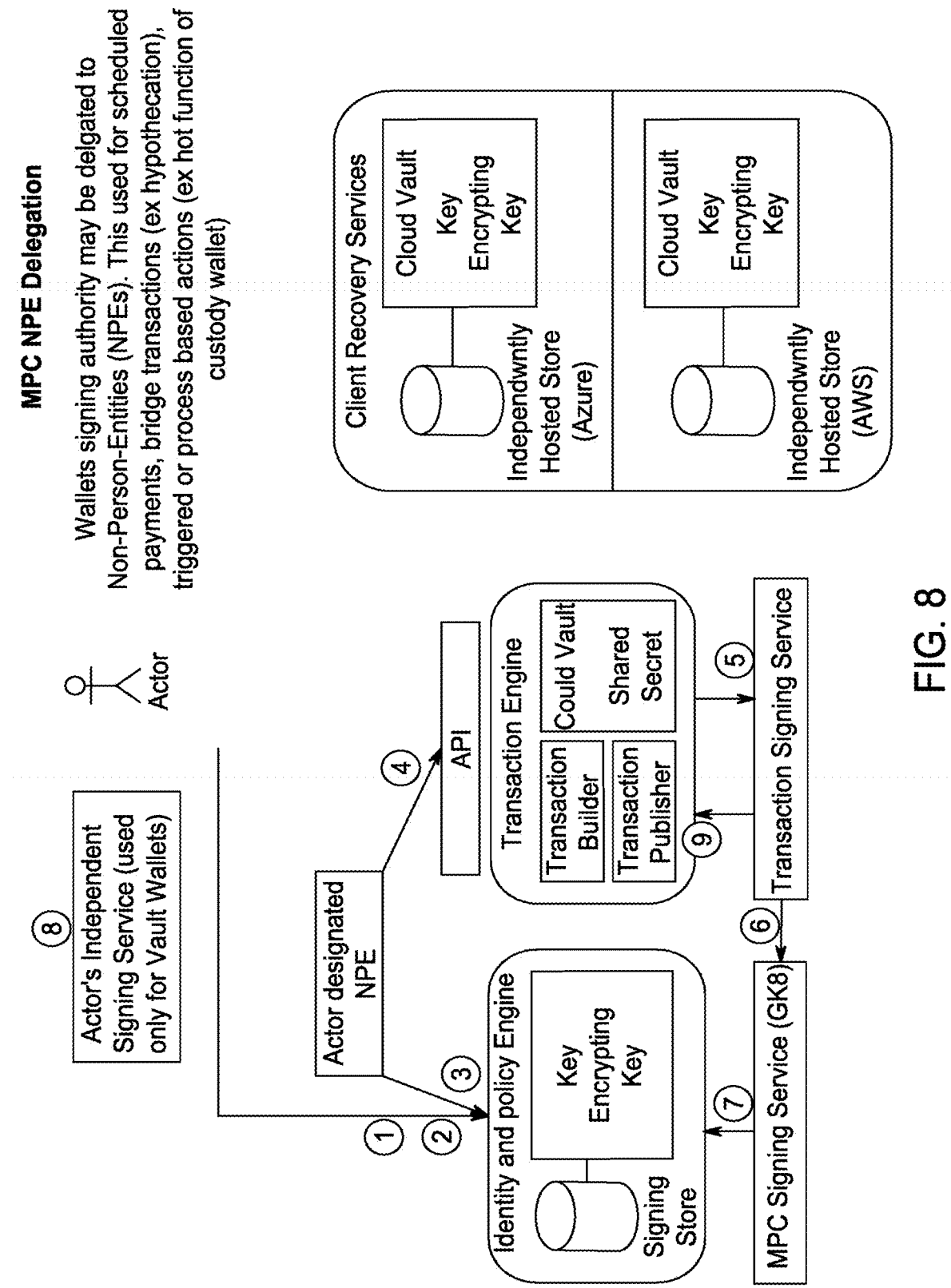
FIG. 8 illustrates a process for delegating signing authority to a Non-Person Entity (NPE) according to one embodiment of the present invention.

FIG. 8 illustrates a process for delegating signing authority to a Non-Person Entity (NPE) according to one embodiment of the present invention. In one embodiment, at step 1, the Actor is logged into the platform via Identity Service and transmits an access token associated with the actor to the Identity Service. In one embodiment, the Actor logs into the platform via a display device running a mobile app, which is operable to facilitate the steps of FIG. 8. In one embodiment, at step 2, a trigger is created that specifies the task to be performed and an event, time, and/or interval under which the Actor's authority may be used. In one embodiment, the Trigger is sent to the Transaction Engine through an API and is stored and is used to assign responsibilities to the NPE. In one embodiment, the Trigger creation event is published to the Transaction signing service and includes the Access Token encrypted with a shared secret and the Trigger payload. In one embodiment, the Trigger publishing event is detected by the Identity and Policy Engine. The Identify and Policy Engine then decrypts the Access Token using the shared secret, validates that the Access Token was issued by the identity source that represents the authorized user. Once validated, the delegation of the NPE's authority to act on behalf of the user in the context of the Trigger is stored in the Signing Store, as represented by step 3, in a record containing the Trigger, the Initiator, the delegated NPE identifier, and/or other identifying data. In one embodiment, the system enables a Trigger to be removed at any time by the initiator and/or actor. In one embodiment, at step 4, The NPE registers (logins in) via Identity Service in the context of a Trigger. The Identity Service validates delegation status in the context of the assigned Trigger. The NPE then receives an access token reflecting this authority.

In one embodiment, at step 5, the NPE executes the assigned task by calling the Transaction Engine API when the Trigger is activated based on the associated time or detected event. The NPE's Access Token is validated and the proposed transaction data structure is formulated by the transaction Engine. In one embodiment, at step 6, the Transaction Engine initiates a transaction event via MPC provider & publishes the transaction to the Transaction signing service. The Identity Service of the Identity and Policy Engine detects a signing event from a service bus, validates legitimacy of the Access Token, the Trigger, and the Delegation, determines if the transaction is authorized using the authority of the group, and if approved, signs the transaction to meet 2 of X standard. If needed (for Vault Wallets, for example), group designated user can be required to sign the transaction the using Independent Signing Service.

In one embodiment, as illustrated in FIGS. 2b-2d, the process of FIG. 8 is operable to substitute the MPC process with the processes illustrated in FIGS. 2b-2d. In one embodiment, the signing for authentication and authorization processes uses multisig rather than MPC techniques.

In one embodiment, the process of separating, but cryptographically linking the authentication and authorization process occur on-chain (i.e., on a DLT). In this embodiment, the process does not require an encrypted access token to link the authentication and authorization steps as the smart contract authorization process can only occur in the context of an authenticated wallet transaction.

In one embodiment, the present invention is operable to utilize the system and method disclosed in U.S. patent application Ser. No. 16/851,184, which is incorporated herein by reference in its entirety. Specifically, the present invention is operable to utilize smart contracts (i.e., executable code stored on a decentralized ledger) to create contract wallets (i.e., smart contracts that encapsulate wallets) to be used to initiate transactions as a proxy for a wallet representing a user or entity. Furthermore, utilizing these methods and systems enables the separation of authentication of an initiator (wallet signing a transaction) from authorization process(es) encoded in a smart contract or other source. Advantageously, an individual with an assigned wallet can initiate a transaction from a smart contract wallet representing an entity's authority. In this case, authentication is performed by the act of the initiating wallet signing a proposed transaction or other state change, and authorization is performed by processes encoded in the smart contract or other sources. For example, this technique can be used to determine if the initiator (signing wallet) is an authorized member of the group with authority based on the nature of the proposed transaction.

In each disclosed embodiment, the end result is a signed transaction where the initiator has been authenticated and authorized using separate processes that are cryptographically linked to prevent injection of unauthorized data. In one embodiment, the authorization process is conducted "on-chain" (e.g. by a smart contract executed through a DLT) or "off chain" using traditional computing processes linked by an access token. In one embodiment, these techniques are combined for hybrid on and off chain authorization. In other words, the authority to sign a wallet may use the off-chain implementations described, with further authorization steps occurring in series using the "on-chain" authorization steps.

Advantageously, once authentication and authorization steps have been separated, but linked in the context of a transaction, the present invention enables to injection of many different forms and methods of authorization that are useful in the context of decentralized transactions, especially those that involve corporate authority structures. Various embodiments are disclosed for methods of decentralized authorization which are used together and/or separately from any of the proposed linking methods described above.

In one embodiment, group structures (i.e., groups and relationship between groups, memberships and/or roles) are recorded on-chain (stored on a distributed ledger) or off-chain (stored in centralized data stores). The initiator's authority to act on behalf of an entity is derived from these group structures to determine if an actor is authorized to conduct a proposed transaction. If authorized using an on-chain model, the transaction is executed through the entity's contract wallet, a novel structure that enables a transaction to be executed as if the transaction was signed by a public/private key. In one embodiment, the present invention is operable to utilize an entity contract wallet through account abstraction. Account abstraction in a DLT system refers to separating the control of an account (i.e., digital wallet) from its associated private key. Account abstraction enables a digital wallet to be controlled by a smart contract rather than by the private key. The smart contract can contain predefined logic to facilitate customizability in the control of the digital wallet.

In one embodiment, the separated authentication process with a consensus authorization or voting model are combined. In this embodiment, an authenticated user proposes a transaction and initiates a vote, authorized members (often cryptographic token holders) cast their vote, the votes are tallied using configurable methods in the smart contract, and if authorized, the transaction is initiated using the associated contract wallet as taught in the previous embodiment.

In one embodiment, business processes stored and configured on the distributed ledger are utilized with the present invention. The disclosed data structure (illustrated in FIGS. 13a and 13b) enables configurable business processes involving one or more steps to be inserted in the authorization process for a proposed transaction. In one embodiment, these embodiments are used separately or together. In one embodiment, a decentralized policy enforcement point, as described in U.S. patent application Ser. No. 17/083,622, which is incorporated here by reference in its entirety, is inserted or used in conjunction with other disclosed authorization techniques to determine if a proposed transaction is authorized. Advantageously, the disclosed embodiments provide an on-chain approach that includes DLT-native enterprise authentication and authorization models that are decentralized at all levels unlocking the full potential of DLT systems.

In one embodiment, a smart contract is used to encapsulate a digital wallet that holds group value and represent group authority. These encapsulated wallets ("proxy wallets") are used to execute transactions on behalf of the group. In this embodiment, authentication occurs using any of the methods mentioned above and results in a signed transaction proposed in a group context. An external smart contract assessing the authority of the initiator in the group context is consulted and if authorized the transaction is initiated via the proxy wallet. This sequence contains the disclosed pattern of cryptographically linking separate authentication (used to sign the transaction) and authorization (via an authorization smart contract) processes. If approved, the transaction is executed on behalf of the entity using an IcontractWallet as described below.

Figure 9:
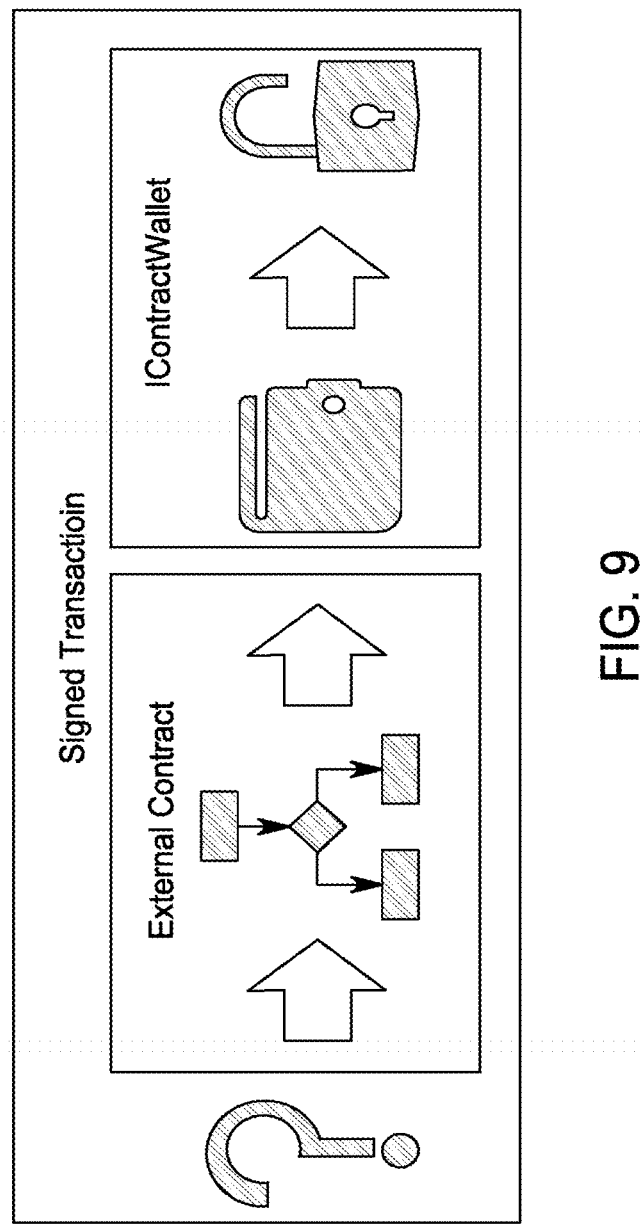
FIG. 9 illustrates a proxy wallet according to one embodiment of the present invention

FIG. 9 illustrates a proxy wallet according to one embodiment of the present invention. As illustrated in FIG. 9, IcontractWallet (a proxy) is used to permit external contracts to operate a wallet without a wallet secret and/or private key. Sample code for implementing a proxy wallet is set forth below.

| IcontractWallet Interface |
|---|
| pragma solidity >=0.6.0 <0.7.0;<br>/\*\*<br>@title Contract Wallet<br>Designed to be operated by a token or smart contract wrapper<br>@notice Can hold an ERC-20, ERC-721, ERC-1400 tokens, and Ether.<br>\*/<br>abstract contract IcontractWallet {<br>/\*\*<br>@notice Transfer ether<br>@param to Ether recipient address<br>@param value Value to be transferred |

| IcontractWallet Interface |
|---|
| @param data (optional) additional data for policy enforcement<br>/\*<br>function etherTransfer(<br>address to,<br>unit value,<br>bytes calldata data)<br>external<br>virtual<br>returns (bool);<br>/\*\*<br>@notice Transfer an ERC-20 or backward compatible token with ERC-20<br>@param token Token address that will be transferred<br>@param to The recipient address<br>@param value Value to be transferred<br>@param data (optional) additional data for policy enforcement<br>\*/<br>function erc20Transfer(<br>address token,<br>address to,<br>uint value,<br>bytes calldata data<br>)<br>external<br>virtual<br>returns (bool);<br>/\*\*<br>@notice Transfer an ERC-721 or backward<br>compatible token with ERC-721<br>@param token Token address that will be transferred<br>@param to The recipient address<br>@param tokenId ERC-721 token id to be transferred<br>@param data (optional) additional data for policy enforcement<br>\*/<br>function erc721Transfer(<br>address token,<br>address to,<br>uint tokenId,<br>bytes calldata data<br>)<br>external<br>virtual<br>payable;<br>/\*\*<br>@notice Transfer an ERC-1400 or backward compatible token with 1400<br>@param token Token address that will be transferred<br>@param partition Partition<br>@param to The recipient address<br>@param value Value to be transferred<br>@param data (optional) additional data for policy enforcement<br>\*/<br>function erc1400TransferByPartition(<br>address token,<br>bytes32 partition,<br>address to,<br>uint value,<br>bytes calldata data<br>)<br>external<br>virtual<br>returns (bytes32);<br>} |

In one embodiment, IcontractWallet is a interface that wraps a smart contract that enables the creation and operation of wallets (e.g., blockchain addresses) that operate within a signed context but do not require a private key. These wallets emulate wallets held by users in those transactions on tokens, or other transactions that wallets perform, are permitted. In one embodiment, the authority to operate the wallet is delegated, in the manner described above, to third party smart contracts (the contract that created the IcontractWallet). In this embodiment, a contract that represents the entity and authorizes initiators to transact with the Proxy Wallet on behalf of the entity.

Figure 10:
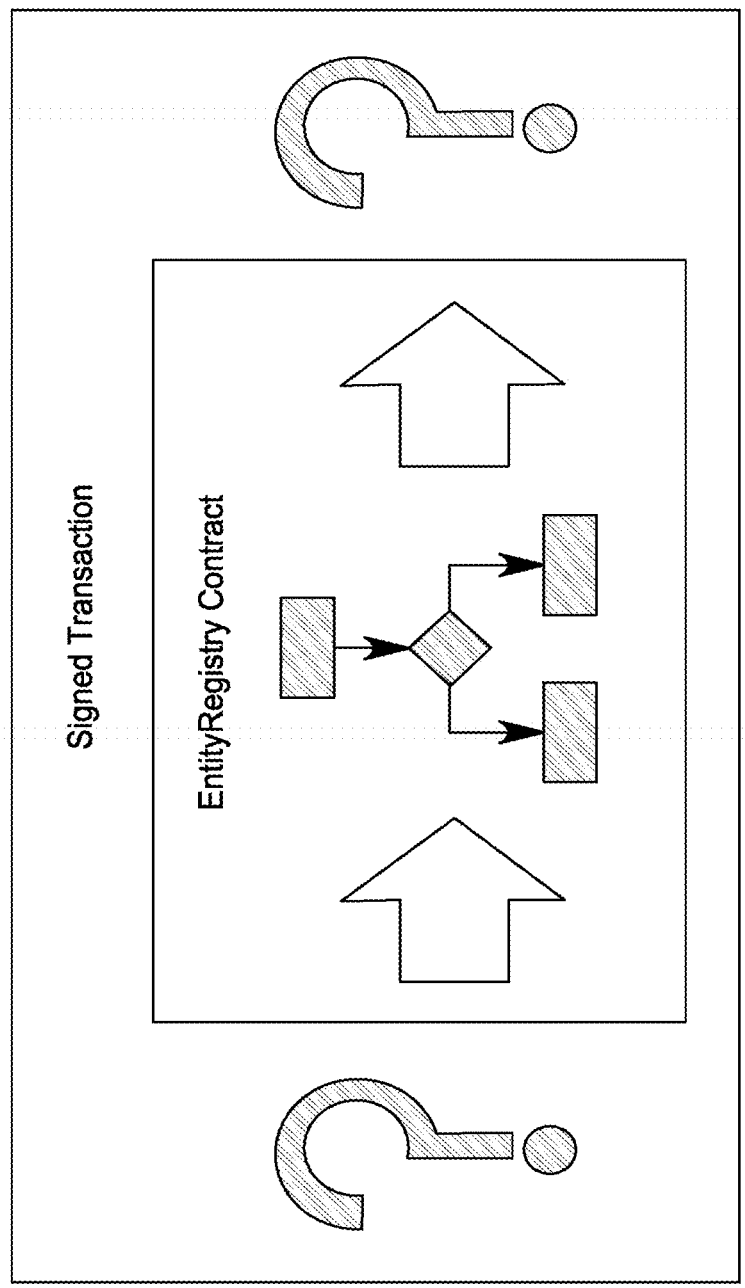
FIG. 10 illustrates a smart contract produced Entity Token representative of an entity according to one embodiment of the present invention.

FIG. 10 illustrates an Entity Token that represents an entity and is produced by a smart contract according to one embodiment of the present invention. In one embodiment, Entity Tokens are non-fungible (e.g., ERC-721) tokens, that represent an individual, group, or non-person entity (NPE) issued via the EntityRegistry Smart Contract. In one embodiment, the Entity Tokens are assigned an Icontract-Wallet as described in the previous section. In one embodiment, the EntityRegistry Contract consults an Authorization Process to determine the initiator's right to perform a transaction based on logic including assessing the signer's role or affiliation with the entity.

Figure 11:
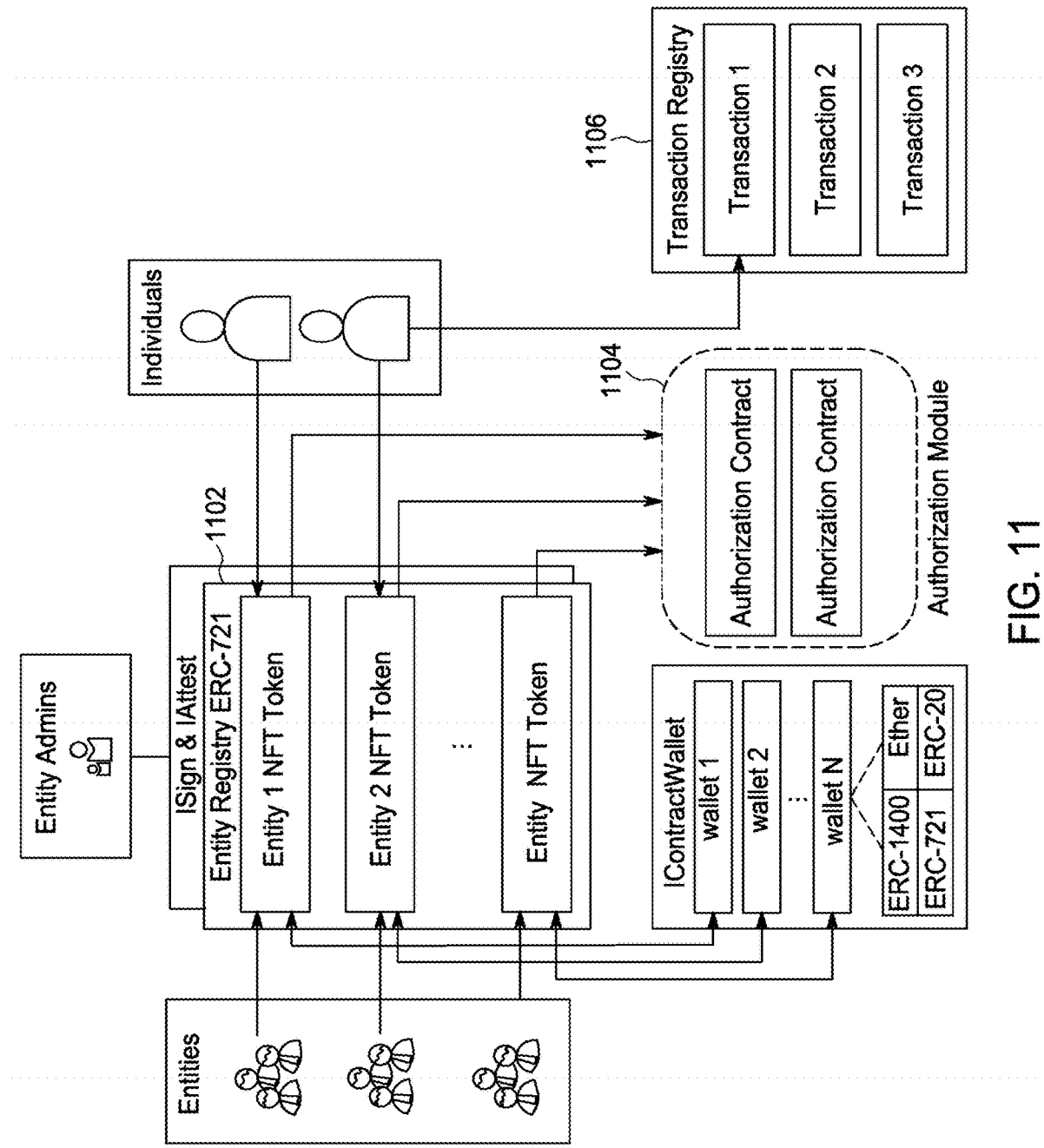
FIG. 11 illustrates a simplified structure for an on-chain implementation of group wallets to achieve separation of authentication and group authorization in a single transaction according to one embodiment of the present invention.

FIG. 11 illustrates a simplified structure for an on-chain implementation of group wallets to achieve separation of authentication and group authorization in a single transaction according to one embodiment of the present invention. FIG. 11 illustrates two on-chain examples of individuals signing transactions and illustrates the process for separating authentication and group authorization in a single transaction. In one example, an individual signs a transaction to move value in Entity 1's wallet. EntityRegistry consults with an Authorization Contract of Authorization Module 1104 to determine if the individual has the right to move value in the Entity 1's wallet based on the individual's affiliation with the entity. In another example, the individual proposes a transaction in Transaction Registry 1106. The individual signs the transaction via Entity 2 token. EntityRegistry 1102 consults with Authorization Module 1104 to execute the transaction.

An example of EntityRegistry interface description code is set forth below.

```
pragma solidity >=0.6.0 <0.7.0;
/**
 * @title EntityRegistry base contract
 * Entities are represented by a non-fungible (ERC721) tokens and can
be owned by one or multiple wallets.
 * All Entities will contain an embedded wallet making it possible to
transact with value in the entity context
    abstract contract IEntity Registry {
    /**
     * @notice NFT created
     * @param uuid NFT unique identifier
     */
    event EntityCreated(uint uuid);
    /**
     * @notice NFT removed
     * @param uuid NFT unique identifier
     */
    event EntityRemoved(uint uuid);
    /**
     * @notice Create a request to create the designated Entity NFT to the fungible
    token in exchange for value, creates a purchase order
     * @param uuid NFT token identifier (must be unique)
     * @param name NFT token name
     * @param class (optional) EntityClassRegistry class token (class contact & uniqueId)
     * @param data (optional) additional data for policy enforcement
     * @return tokenId unique identifier for the issued token
     */
    function createEntity(
       uint uuid,
       bytes32 name,
       address class,
       bytes calldata data
    )
       external
       virtual
       returns (uint tokenId);
    /**
     * @notice Remove the entity token
     * @param uuid token unique identifier
     */
    function removeEntity(uint uuid) external virtual returns (bool);
    /**
     * @notice Get the wallet for the entity
     * @param uuid token unique identifier
     * @return class address for the entity's class in the class registry
     */
    function getClass(uint uuid) external virtual returns (address class);
    }
    pragma solidity >=0.6.0 <0.7.0;
    /**
     * @title Entity Wallet
     *
     * @notice Designed to open a possibility for the entities that will be represented
    by an ERC-721 token
     * hold another asset that can be presented by an ERC-20, ERC-721, ERC-1400
    tokens and by an Ether.
     * Interface must be implemented by an EntityRegistry.
     */
    abstract contract IEntity Wallet {
    /**
```

```
* @notice Get the wallet for the entity
* @param entityId token unique identifier
* @return wallet address for the entity's wallet
*/
function getWallet(uint entityId) external virtual returns (address wallet);
/**
* @notice Transfer ether
* @param entityId ERC-721 token id (registry must have a link
with a wallet by this id)
* @param to Ether recipient address
* @param value Value to be transferred
* @param data (optional) additional data for policy enforcement
*/
function etherTransfer(
    uint entityId,
    address to,
    uint value,
    bytes calldata data
)
    external
    virtual
    returns (bool);
/**
* @notice Transfer an ERC-20 or backward compatible token with ERC-20
* @param entityId ERC-721 token id (registry must have a
link with a wallet by this id)
* @param token Token address that will be transferred
* @param to The recipient address
* @param value Value to be transferred
* @param data (optional) additional data for policy enforcement
*/
function erc20Transfer(
    uint entityId,
    address token,
    address to,
    uint value,
    bytes calldata data
)
    external
    virtual
    returns (bool);
/**
* @notice Transfer an ERC-721 or backward compatible token with ERC-721
* @param token Token address that will be transferred
* @param entityId ERC-721 token id (registry must have a link
with a wallet by this id)
* @param to The recipient address
* @param tokenId ERC-721 token id to be transferred
* @param data (optional) additional data for policy enforcement
*/
function erc721Transfer(
    address token,
    uint entityId,
    address to,
    uint tokenId,
    bytes calldata data
)
    external
    virtual
    payable;
/**
* @notice Transfer an ERC-1400 or backward compatible token with 1400
* @param token Token address that will be transferred
* @param entityId ERC-721 token id (registry must have a link
with a wallet by this id)
* @param partition Partition
* @param to The recipient address
* @param value Value to be transferred
* @param data (optional) additional data for policy enforcement
*/
function erc1400TransferByPartition(
    address token,
    uint entityId,
    bytes32 partition,
    address to,
    uint value,
    bytes calldata data
)
    external
```

```
    virtual
    returns (bytes32);
}
pragma solidity >=0.6.0 <0.7.0;
/*
* @title Asset wallet factory
*/
abstract contract IEntity WalletFactory
  /**
   * @notice Deploy new entity wallet
   * @param entityId ERC-721 token id (registry must have a link
   with a wallet by this id)
   * @param wallet Address of the deployed wallet
   */
   * function newAssetWallet(uint entityId) internal virtual returns (address wallet);
}
```

Figure 12:
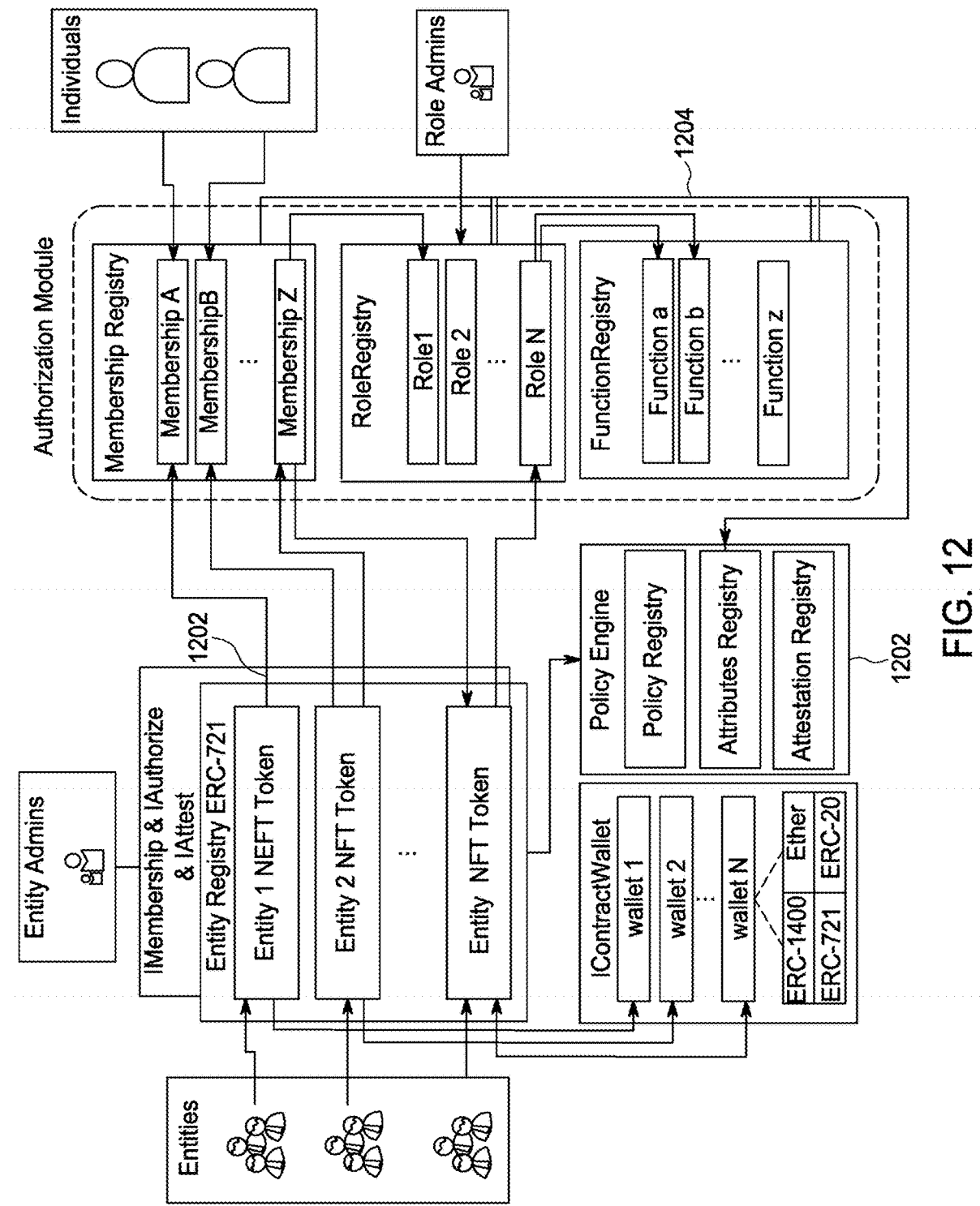
FIG. 12 illustrations an on-chain authorization model according to one embodiment of the present invention.

FIG. 12 illustrations an on-chain authorization model that includes membership, role, and function registries according to one embodiment of the present invention. In one embodiment, the IMembership smart contract interface is operable to access the data structures illustrated in FIGS. 13a and 13b that contain the linkages between and among individuals and entities. In one embodiment, when an individual attempts to operate an entity wallet, to sign a proposed transaction, or attest to data, an EntityRegistry smart contract consults Policy Engine 1202 and/or Authorization Module 1204 to assess the authority of the individual to perform the transaction in a group context.

Figure 13A:
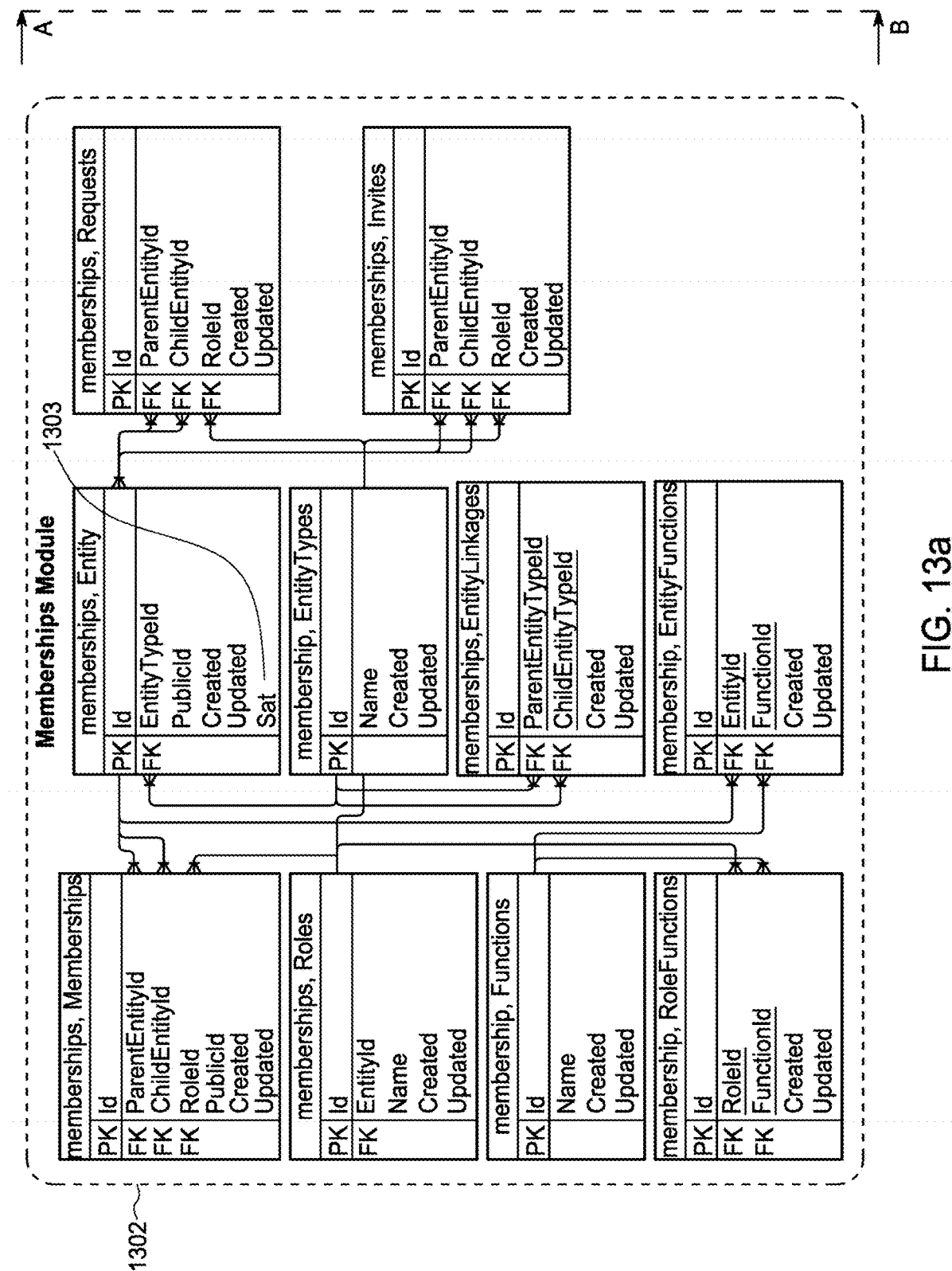
FIG. 13*a* illustrates membership authorization data tables and data models according to one embodiment of the present invention.
Figure 13B:
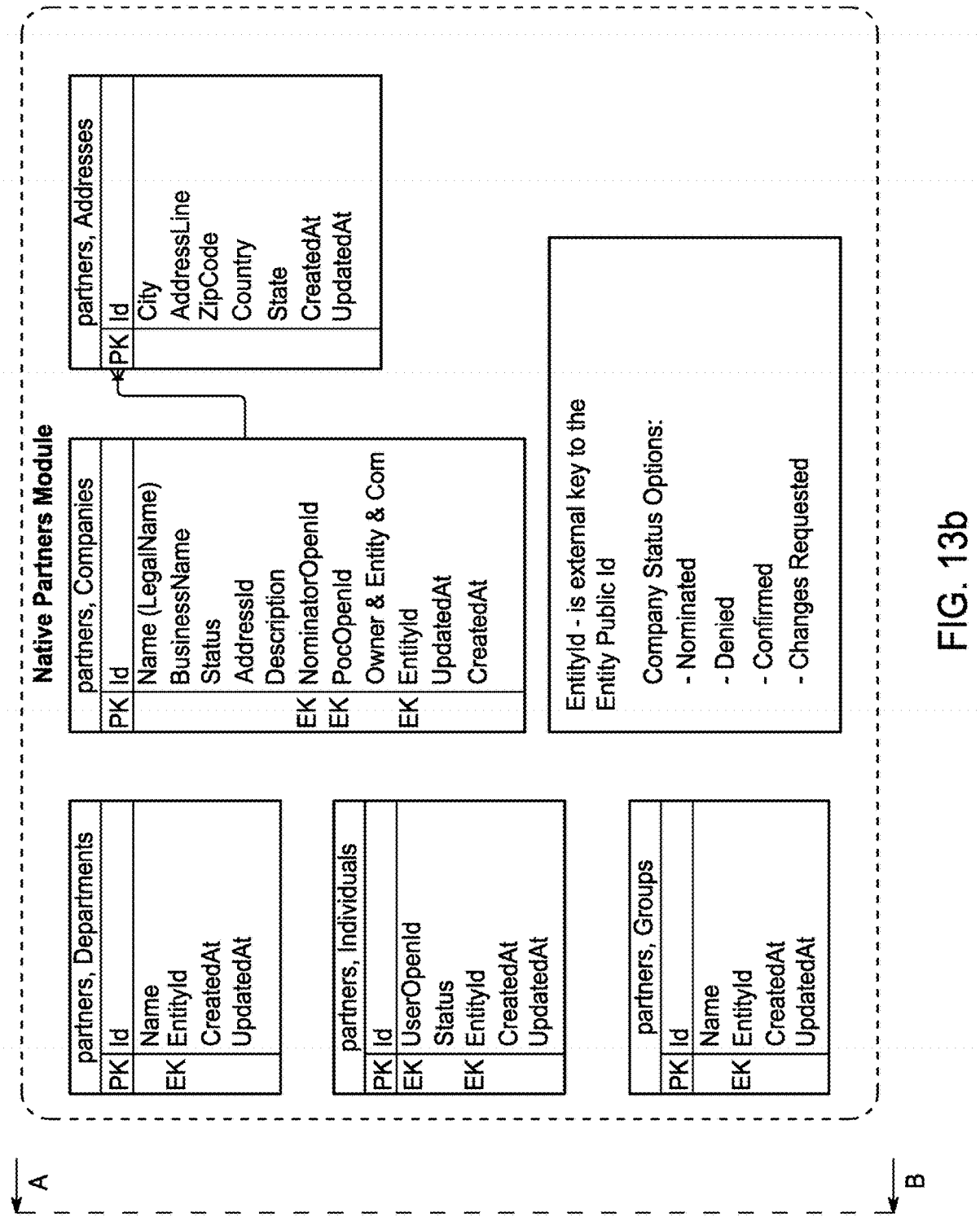
FIG. 13*b* is a continuation the illustration of membership authorization data tables and data models according to one embodiment of the present invention.

FIGS. 13a and 13b illustrates membership authorization data tables and data models according to one embodiment of the present invention. The schema and data model support any class of entity, such as those shown in Membership Module 1302. The data tables of FIGS. 13a and 13b includes relationships that are used to determine one's authority to act on behalf of an entity. Salt attribute 1303 in the entity table is used to generate the key fragment needed to decrypt and operate an Entity owned wallet in the manner described above. As a nonlimiting example, an entity definition includes an individual, group, or non-person entity. In one embodiment, entity relationships are nested. A nested entity relationship is a group that contain another group. In this embodiment, authorization is derived from role within a group (context) or is assigned to an entity via membership. Membership is an entity/role/entity linkage—though in one embodiment the membership linkage is expressed as entity/role, entity/group, or even entity/entity (social media). Non-limiting examples of authorization structures includes:

Dan (entity-individual) is CEO (role) of Securrency (entity-group)

Dan (entity-individual) is a member (role-default) of Securrency finance department(entity-group)

Securrency Finance (entity-group) is a Department (role) of Securrency (entity-group)

Dan (entity-individual) is a member [role implicit] of Securrency Engineering department(group)

Dan (entity-individual) is an Administrator (role) of Securrency system [entity-group implicit]

Dan (entity-individual) is connected via LinkedIn [role implicit] to John (entity-individual)

Delegation of authority can be derived from membership attributes. For example:

Securrency (entity-group) is Broker (role) for Dan (entity-individual)

With Expiration:
Dan has Approval Authority for John while on vacation (expiring authority)
Dan is Security Offices for the night watch (expiring authority)

However, one of ordinary skill in the art will appreciate that it is the structure, rather than any specific example, that is relevant to the present invention. Using the data model and schema of FIGS. 13a and 13b, a number of models for managing authority in an entity context are possible. For example the data model and schema may reflect authority that is centrally assigned by group administration personnel, any member may add another member, or through affinity with other groups and/or entities. There are also various possibilities for membership types, such as one-way trust (add a member without agreement), and two-way trust (both entities must agree to the addition). Entity visibility can be varied. For example, groups can be only visible to members of the groups or members can be hidden from others in the group. Participation in a group can be through invitation only or based on other conditions. In various embodiment, these authority structures are represented by the data model and scheme of FIGS. 13a and 13b.

Figure 14:
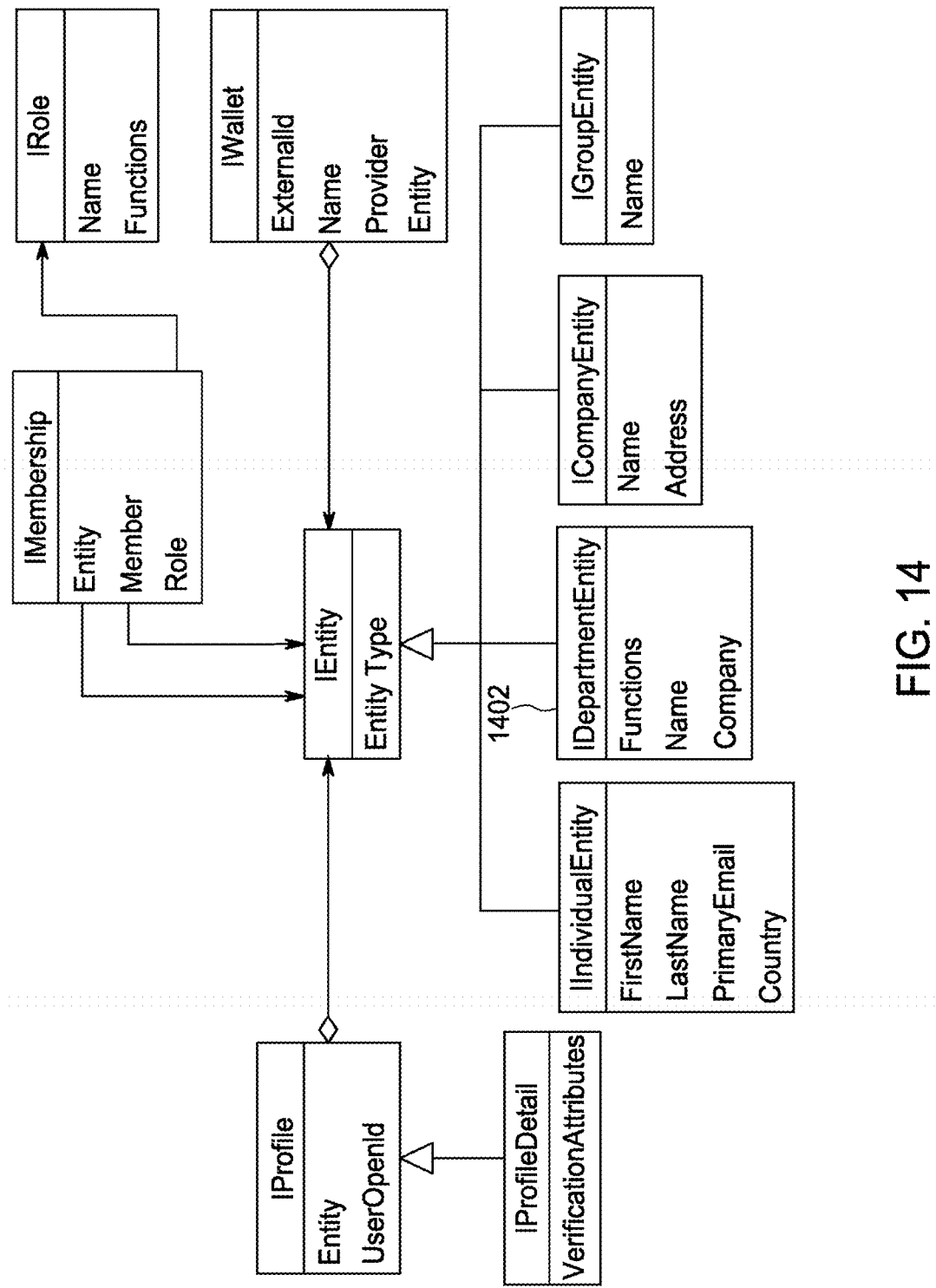
FIG. 14 illustrates an object relationship data model for assessing an individual's authority to act on behalf of an entity according to one embodiment of the present invention.

FIG. 14 illustrates an object relationship data model for assessing an individual's authority to act on behalf of an entity according to one embodiment of the present invention. FIG. 14 illustrates a specific example of a relationship data model based on a specific authority structure. In one embodiment, at 1402, the linkage between an IDepartmentEntity (Name: GOOGLE Finance Department) and an IIndividualEntity (FirstName: Dan, LastName: Doney) can be linked via a membership associating a role (Name: Comptroller) with the membership. Based on this membership and role, the linked entity can be authorized to perform specific Functions (Name: SendMoney) as a result of this linkage. When a transaction is authorized using this linkage, accountability is through a membership identifier & provenance of authority is traced through the data model linkages. In one embodiment, multilevel identifiers are used when authority is nested through hierarchical membership.

In one embodiment related to an off-chain implementation, the data model of FIG. 14 is created in the following steps:

Functions are assigned to an Entity via an approval process; A Verification Agent has the ability to attest to an entity's qualification to perform a function; Entities (e.g., individuals, groups, NPE's, etc.) are assigned to parent entity via a membership service; Authorities (i.e., right to perform a function) are delegated from parent entity to child entity via this linkage; When an entity presents credentials demonstrating membership, they receive a token containing a key fragment and a membership identifier used for accountability. In one embodiment, the token also contains a role which is used to further restrict access to certain group functions. In one embodiment, the entity does not have or does not need to have direct access to fragment, identifier, or role; Group authority is expressed as a public/private key pair. The transaction is approved (signed) using multisig, MPC methods, or assembly of key fragment to decrypt the private key as disclosed above; The group authority is exercised by presenting the token containing the fragment which in turn is used to decrypt the private key and enable the action.

In one embodiment related to an on-chain implementation, the data model of FIG. 14 is created in the following steps: Functions are assigned to an Entity via an approval process; Verification Agent has the ability to attest to an entity's qualification to perform a function; An entity token is deployed representing the authority to perform one or more functions on behalf of the entity (group); Entities (e.g., individuals, groups, NPE's, etc.) are assigned to the parent entity via a membership registry; Authorities (right to perform a function) are delegated from parent entity to child entity via this linkage; In one embodiment, member entities exercise group authority by presenting individual credentials to the group by signing IAuthorize or IAttest data structures via the Entity Registry smart contract (see element 1202 of FIG. 12).

In one embodiment, the present invention utilizes a Consensus Authorization Model through consensus wallets in the cryptographically linked authentication and authorization pattern described as the base pattern of the present invention. Consensus wallets follow the same separation pattern as group wallets. In one embodiment utilizing consensus wallets the process includes, an initiator proposes a transaction by authenticating (signing an initiation transaction), an independent authorization process is engaged (in this case a consensus or voting model), and if authorized executes the transaction via a contract wallet. In one embodiment, the present invention is operable to utilize non-fungible tokes (NFTs) using the Ethereum Request for Comment-721 (ERC-721) standard or other similar standard known in the art. In the preferred embodiment, the present invention utilizes fungible tokens (FTs) using the ERC-20 token standard. In this embodiment, the authorizers are the token holders casting authorizing votes. ERC-20 tokens are designed to have many owners and ownership is reflected, among other things, based on the percentage of shares owned by a particular wallet.

Figure 15A:
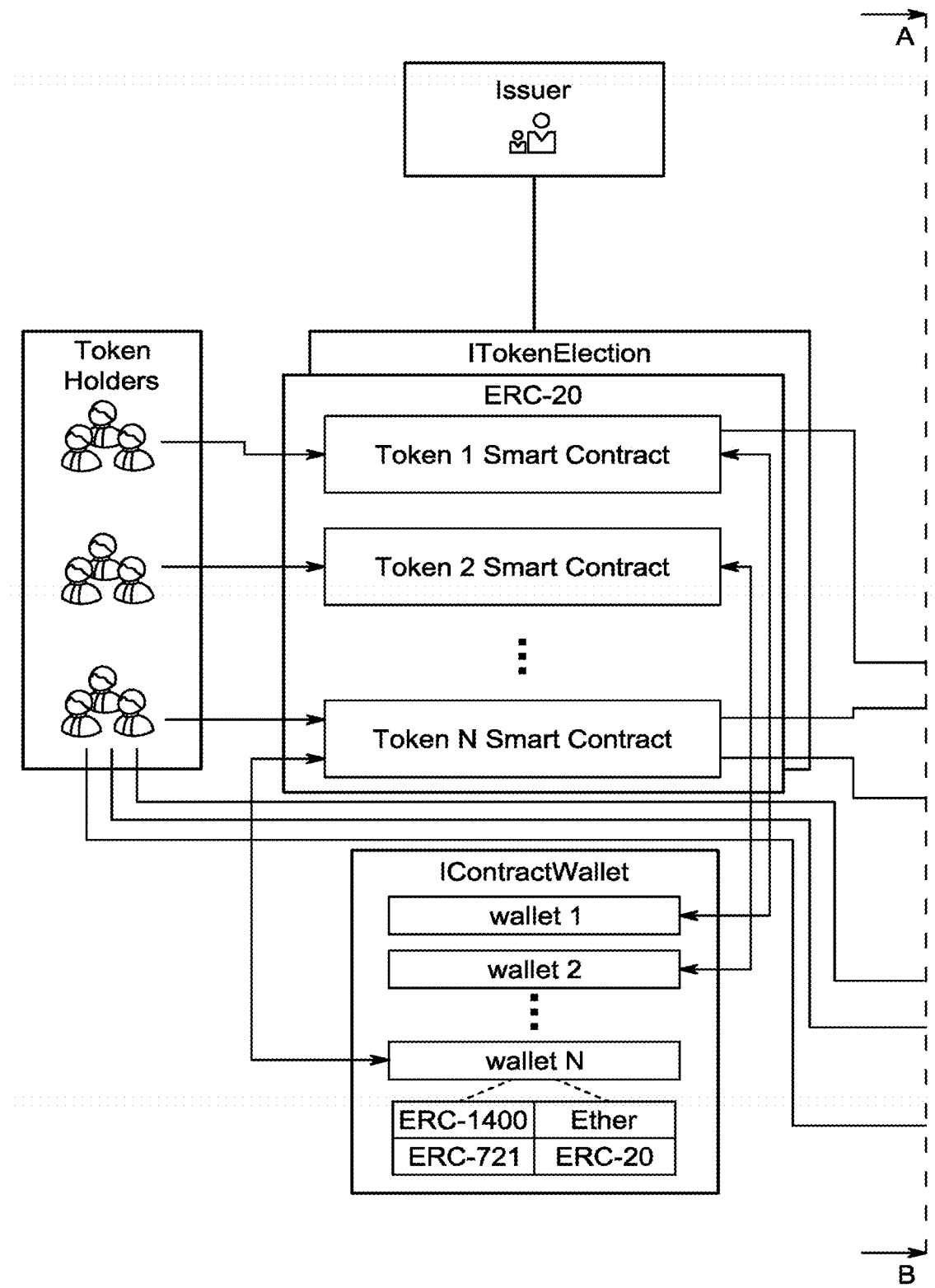
FIG. 15*a* illustrates an architecture in which authorization is accomplished through consensus according to one embodiment of the present invention.
Figure 15B:
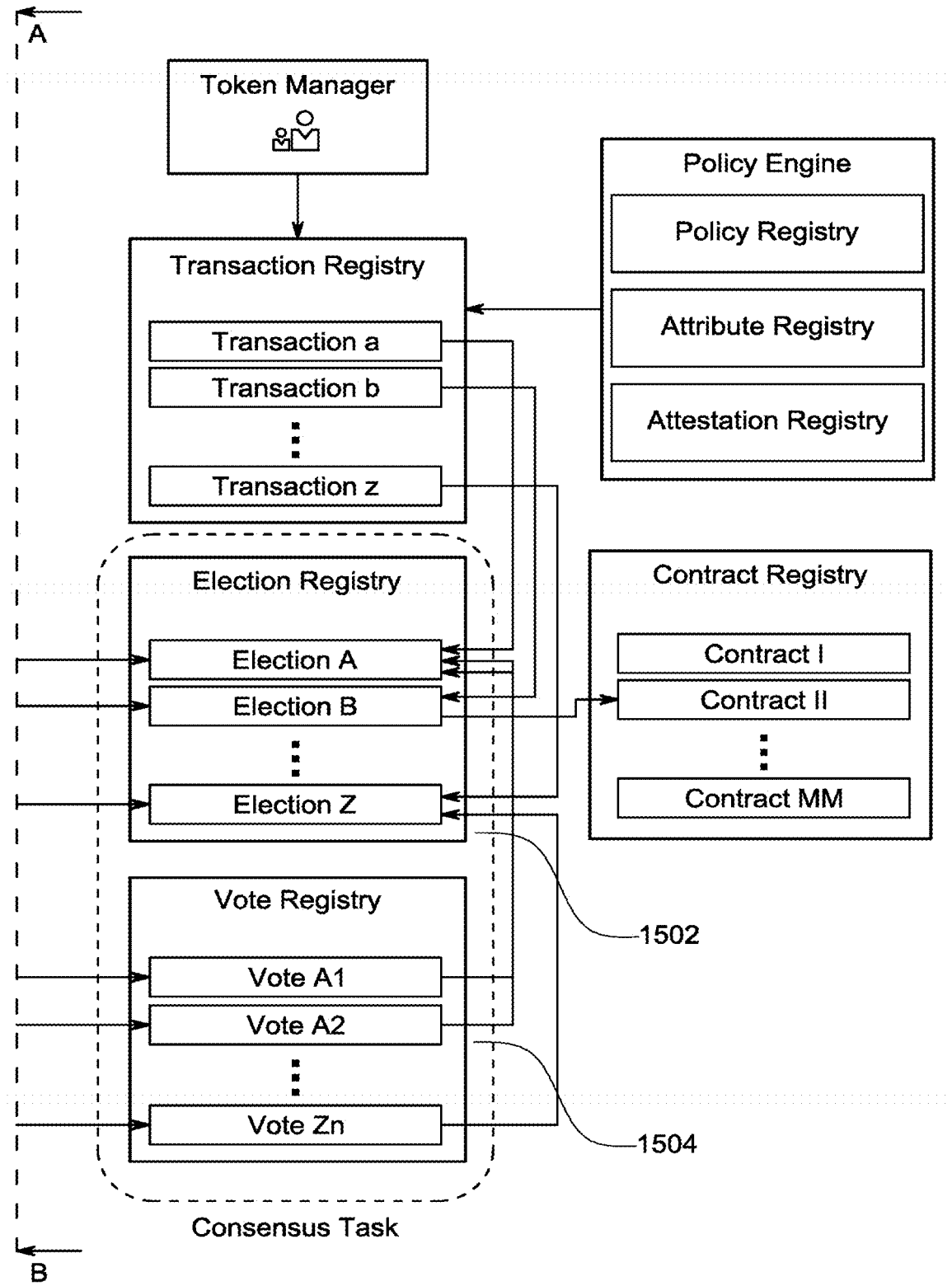
FIG. 15*b* is a continuation of the illustration of an architecture in which authorization is accomplished through consensus according to one embodiment of the present invention.

FIGS. 15a-15b illustrates an architecture in which authorization is accomplished through consensus according to one embodiment of the present invention. In one embodiment, the architecture of FIGS. 15a-15b includes ElectionRegistry 1502 database and VoteRegistry 1504 database. In one embodiment, ElectionRegistry 1502 and VoteRegistry 1504 are computer modules that include corresponding smart contracts. In one embodiment, ElectionRegistry 1502 and VoteRegistry 1504 are smart contracts operable to publish data to a DLT. In one embodiment, the architecture of FIGS. 15a and 15b is a computer architecture that includes a plurality of computer modules operable to facilitate the functions of the present invention. In one embodiment, the architecture of FIGS. 15a and 15b is a decentralized network architecture that includes a plurality of decentralized applications (dApps), which are software programs run on a DLT or peer-to-peer (P2P) network of computers instead of on a single computer. In one embodiment, the ElectionRegistry 1502 and/or the VoteRegistry 1504 are dApps. In one embodiment, the computer architecture and/or the decentralized network architecture of FIGS. 15a and 15b is a computer platform and/or a decentralized platform operable to facilitate the functions and processes are the present invention.

As noted above, the token smart contract is assigned a Smart Contract wallet. In one embodiment, the token issuer, or other authorized party, proposes a transaction. This party then initiates an election using a Consensus smart contract. In one embodiment, elections use custom smart contracts to tally votes if special vote weighting or quorum techniques are desired. Token holders then cast votes by signing a transaction via wallet. In one embodiment, votes are tallied proportional to share ownership and voting rights. However, this is customizable by the Consensus smart contract. If the election passes, the proposed transaction authorized and executed using an IContractWallet.

Corporate governance often involves voting of certain classes of shareholders (token holders). In these cases, a NFT's are used to represent the asset or entity, and link one or more fungible tokens, each representing a share class. In one embodiment, the non-fungible entity token controls the logic regarding the significance of each share class vote. Elections on topics are conducted to decide whether a corporate entity should perform a certain action. Votes are cast (preferably proportional to share ownership though other governance models are possible) by eligible shareholders and results are tallied. If necessary, conditions are met based on corporate bylaws, the entity takes the action.

Blockchain and other DLT's offer an opportunity to accelerate and extend this process. One embodiment of the corporate wallets model shown previously is a consensus wallet where the members hold elections to exercise an authority. In another embodiment, an election to exercise corporate authority is based on share ownership by token holders of a particular class.

Since the election and vote collection smart contract are separate, a token smart contract that represents the entity is operable to incorporate a consensus smart contract to perform certain transactions, allow an upgrade of contract logic, and/or exercise other authority on behalf of the corporate entity it represents using established proxy techniques. The case of an entity represented by a smart contract having a consensus process to allow constituents (token holders) to vote on whether to upgrade its smart contract is a particularly novel and consequential implementation of the pattern.

Figure 15C:
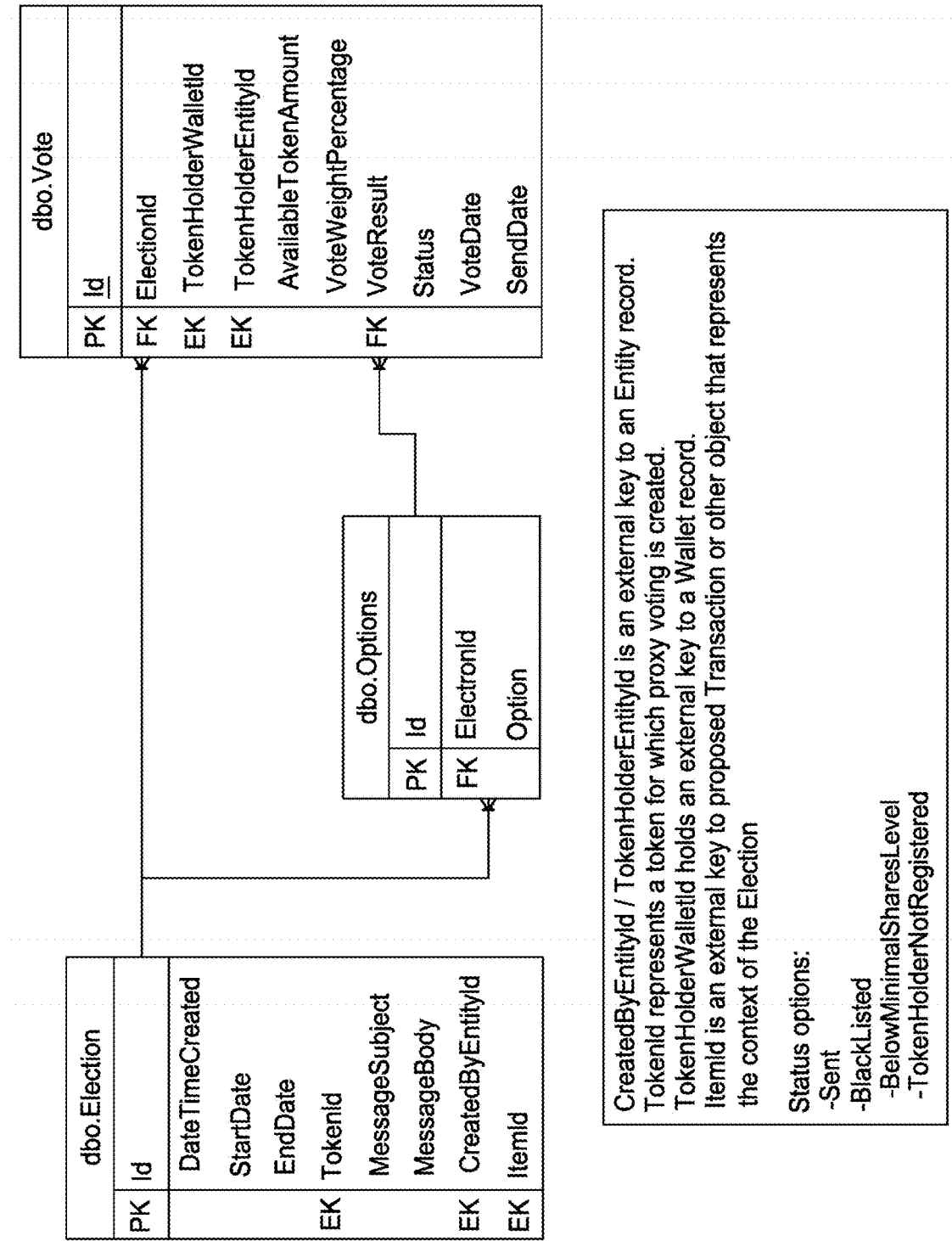
FIG. 15*c* illustrates a data schema diagram on the data structures of the Election Registry and VotingRegistry of FIGS. 15*a* and 15*b* according to one embodiment of the present invention.

FIG. 15c illustrates a detailed data schema diagram on the data structures of the ElectionRegistry and VotingRegistry of FIGS. 15a and 15b according to one embodiment of the present invention. The ElectionRegistry stores details on a proposed election. The proposed transaction is identified by an external key in the ItemId field. Eligible voters in the election are determined by the token (external key tokenId) and its distribution or other models designated by the token (for example, corporate members as defined by the membership function disclosed in a different embodiment). In one embodiment, the ElectionRegistry includes additional details about the election, including a start date, end date, voter instructions, etc. In one embodiment, the ElectionRegistry includes details not shown in FIG. 15c, such as, the consensus model used (e.g., majority, plurality, share weighted consensus, etc.) or quorum requirements. In one embodiment the VotingRegistry includes details about each individual vote, including an election ID (i.e., a string of characters operable to identify the specific election taking place), a token holder wallet ID, a token holder entity ID, an available token amount, a vote weight percentage, a vote results, a status, a vote date, a send date, and/or other information associated with a vote. In one embodiment, options available to a voter for a particular election are presented in the Options table. In one embodiment, the options for transaction approval are Approve and Disapprove. The VotingRegistry contains the results of the Election as eligible voters cast their vote by calling a Voting API or signing a Vote transaction using an eligible wallet. Once a quorum is reached, the ElectionRegistry will approve or deny the proposed transaction based on the election outcome.

In one embodiment, the present invention (i.e., separating, but cryptographically linking, the authentication and authorization process in the context of a transaction) is operable to inject a decentralized workflow authorization process. Decentralized workflow authorization follows the same separation pattern as consensus wallets. In one embodiment the decentralized workflow authorization follows the process of an initiator (i.e., an actor), or delegated non-person entity via a trigger, proposing a transaction by authenticating (signing an initiation transaction), an independent authorization process is engaged (in this case, a workflow process), and if authorized, the transaction is executed via a contract wallet. In one embodiment, the present invention does not use a proposed transaction or contract wallet, but rather performs an authorization process as part of a larger transaction context.

A Workitem smart contract is used to produces tokens that represent workflow states as proposed actions move through configurable workflow processes. Often, the performance of a function (or receipt of authority to conduct actions) comes through processes which involve a sequence of tasks or approvals involving multiple entities in a sequence. These sequences are known as "workflows." "Workitems" are data elements which contain state information to follow the workflow sequence to completion. Workflows consist of one or more tasks and routes that connect the tasks allowing different sequences based on the Workitem and task outcomes.

In one embodiment, the present invention include the above-described techniques, architectures, and data structures to permit the decentralization of workflow management. This embodiment uses smart contracts to perform workflow state management and store and execute processes (workflows). The benefits of decentralization of the storage and execution of business processes is analogous to the benefits of the decentralization of payments. For example, decentralization enables disintermediation allowing coordination between parties to complete processes across organizational boundaries and without dependencies on corporate systems.

Figure 16:
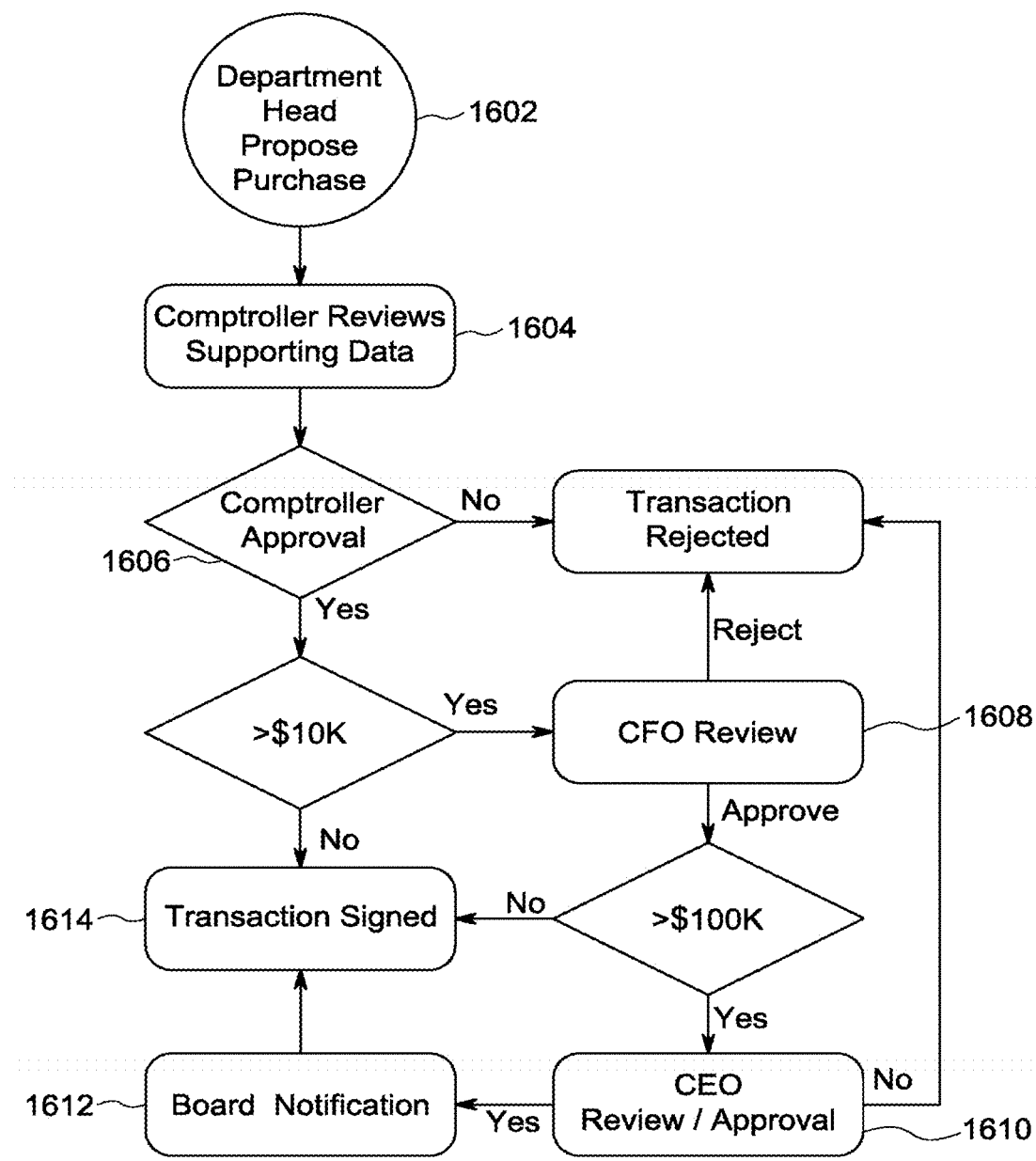
FIG. 16 illustrates a flowchart of a corporate workflow utilizing the present invention according to one embodiment of the present invention.

FIG. 16 illustrates a flowchart of a workflow diagram of an example of a corporate process utilizing the present invention according to one embodiment of the present invention. In one embodiment, the workflow includes one or more tasks, each task having a type, and routes used to connect the tasks. As a nonlimiting example, task types include: boundary tasks (e.g., start and stop), manual tasks (e.g., approvals), decision tasks (e.g., automated state changes based on workitem attributes); and routes (connectors between tasks).

A Workflow is the combination of tasks and routes for a process designed and monitored by flow administrators. In one embodiment, a workflow is captured and represented as map stored on a distributed ledger and executed via a decentralized Workflow Engine that includes smart contracts executed on a DLT. Each workitem progresses through the flow. In one embodiment, as a workitem enters a task, an event is published to the transaction signing service and the affected, and/or other stakeholders, are notified. In one embodiment, these affected entities can select a route (state change) for the workitem, signing with their wallet to result in a state change moving to the next task based on the disposition. For example, the route selection can be approved or denied by the entity or entities. Because the workflows are decentralized, the workflows do not need to depend on centralized systems and can be executed from any wallet.

In one embodiment, each workitem corresponds to a NFT, as a record of state in a WorkitemRegistry smart contract. Each NFT represents the current state of the process for a particular item or responsibility progressing through the workflow. Tasks are specific states within a workflow stored in the TaskRegistry. Manual tasks (those performed by humans) are performed by humans and signed by the responsible party using wallet key pairs. Automated tasks (decision points or other automated processing) are executed via configurable smart contracts. Tasks are connected by routes that represent state changes.

As shown in FIG. 16, an actor (department head) proposes a purchase 1602, such as the purchase of manufacturing equipment. The purchase is represented by a proposed ledger transaction. In one embodiment, at 1604, another actor (comptroller) reviews supporting data, such as pricing, delivery, existing inventory of similar equipment, or any other relevant data. In one embodiment, at 1606, the comptroller is able to approve the ledger transaction, and thus the proposed purchase by signing the ledger transaction based on authority to act determined in the manner described above. In one embodiment, at 1608, where the purchase price greater than $10,000 the Chief Financial Officer (CFO) is notified and provided an opportunity to review and sign an approval transaction for the purchase. In one embodiment, at 1610, where the purchase price is greater than $100,000 a Chief Executive Officer (CEO) approval is required. Once all approvals are obtained, the board is notified (represented by 1612) and the workflow is completed successfully resulting in the execution of the proposed transaction (represented by 1624) to allow the purchase of equipment to be conducted. Advantageously, all tasks are tracked on the DLT and the various signatures are obtained based on authorities to act as described herein. In one embodiment, each state of each workitem is tracked based on the corresponding token as tracked in the WorkitemRegistry.

Figure 17A:
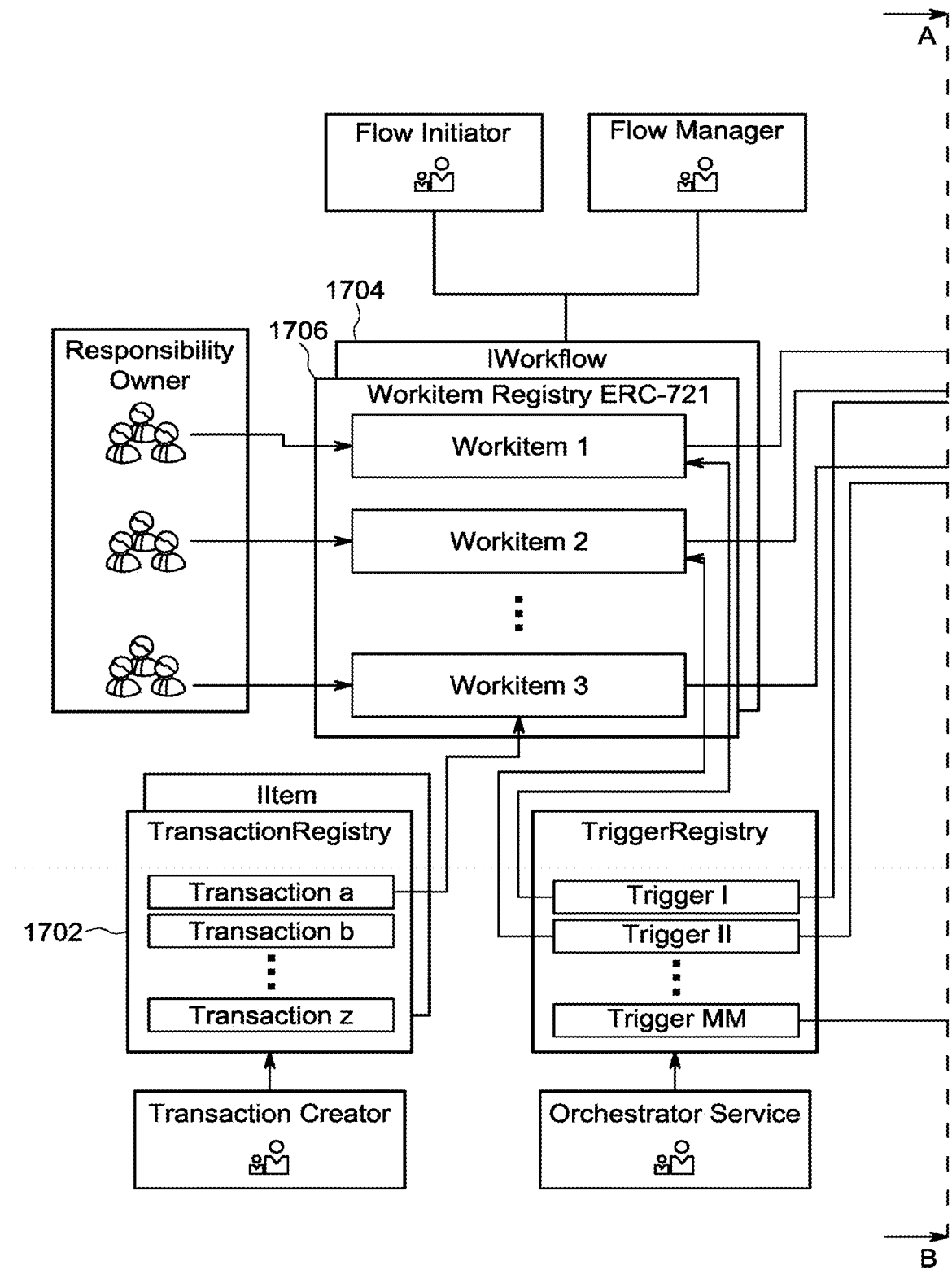
FIG. 17*a* illustrates an architecture of a decentralized workflow system according to one embodiment of the present invention.
Figure 17B:
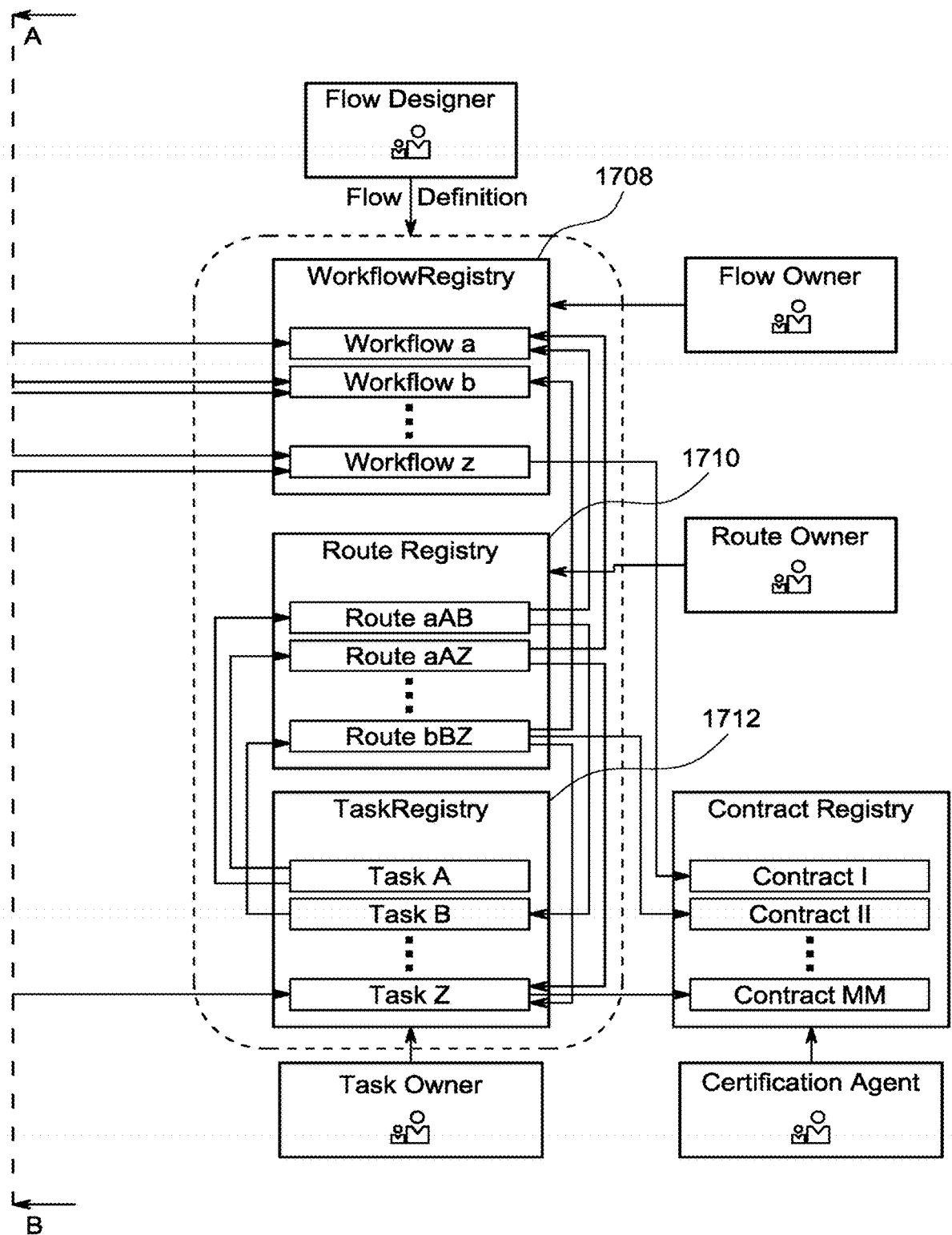
FIG. 17b is a continuation the illustration of an architecture of a decentralized workflow system according to one embodiment of the present invention.

FIGS. 17a and 17b illustrates a architecture of a decentralized workflow system according to one embodiment of the present invention. In one embodiment, DLT transactions are proposed via the TransactionRegistry 1702 and routed for approval via the Workflow Engine 1704 by creating a Workitem in the Workitem Registry referencing the proposed transaction (in the Item field), the designated Workflow, the current Task, and TaskState along with other metadata regarding the datetime of the initiation of the flow, last state change, and/or other relevant data. The WorkitemRegistry 1706 is a smart contract that controls flow processing and maintains the current status of an item in the workflow via the workitem token. WorkflowRegistry 1708 stores the various workflow definitions. In one embodiment, a workflow is a plurality of routes stored in RouteRegistry 1710, that is operable to link tasks in the TaskRegistry. Tasks are descriptions of approvals, smart contracts execution instructions, and/or decisions that result in a change of state of the Workitem. On completion of a task, the Workitem-Registry implements the Workflow by routing the execution to the next task as defined by available routes to enable processing of proposed items (i.e., transactions on the DLT). The present invention enables users to administer and design workflows, tasks, and/or routes. Automated tasks can execute smart contracts that are tested and deployed by certification agents. In one embodiment, the workflow engine is operable to implement the authentication and authorization process described here.

The annotated code below is an example of code of that describes this process.

```
/// <summary>
/// This interface is used to describe processes (task combinations linked by routes).
/// </summary>
public interface IWorkflow : IItem
{
/// <summary>
/// ReferenceId should be used by all interfaces that have objects that
are frequently known by their external identifier.
/// </summary>
[CanBeNull]
string ReferenceId { get; }
/// <summary>
/// Or It's user-friendly name to display (displayName).
/// </summary>
string Name { get; }
/// <summary>
/// The name of the provider.
/// </summary>
[CanBeNull]
string Provider { get; }
ITask Initial { get; }
ITask Final { get; }
}
Task
/// <summary>
/// This interface is used to manage tasks (actions performed in a process).
/// </summary>
public interface ITask : IItem
{
/// <summary>
/// ReferenceId should be used by all interfaces that have objects that
are frequently known by their external identifier.
/// </summary>
[CanBeNull]
string ReferenceId { get; }
/// <summary>
/// Or It's user-friendly name to display (displayName).
/// </summary>
string Name { get; }
/// <summary>
/// The task type which defines the method of processing.
/// </summary>
TaskType TaskType { get; }
/// <summary>
/// Entity responsible for the execution of the task (null means
assignable by trigger or delegation)
/// Creating a task with an assigned entity requires the signature of the entity
/// </summary>
[CanBeNull]
IEntity Entity { get; }
/// <summary>
/// The name of the provider.
/// </summary>
[CanBeNull]
string Provider { get; }
}
/// <summary>
/// This interface is used to describe routes (flow controllers that
link routes based on input).
/// </summary>
public interface IRoute : IItem
{
/// <summary>
/// ReferenceId should be used by all interfaces that have objects that
are frequently known by their external identifier.
/// </summary>
[CanBeNull]
string ReferenceId { get; }
/// <summary>
/// Or It's user-friendly name to display (displayName).
/// </summary>
string Name { get; }
/// <summary>
```

```
/// The process in which the route is tied to
/// </summary>
IWorkflow Workflow { get; }
/// <summary>
/// The task to initiate if the route is traversed
/// </summary>
ITask Task { get; }
/// <summary>
/// The task that is completed to traverse route
/// </summary>
ITask Source { get; }
/// <summary>
/// Used to define if a route is the default outbound path for a task
/// </summary>
bool IsDefault { get; }
/// <summary>
/// The name of the provider.
/// </summary>
[CanBeNull]
string Provider { get; }
}
Workitem
/// <summary>
/// This interface is used to describe workitems. Workitems are used to track
state in a task and or process.
/// </summary>
public interface IWorkitem : IItem
{
/// <summary>
/// ReferenceId should be used by all interfaces that have objects that are
frequently known by their external identifier.
/// </summary>
[CanBeNull]
string ReferenceId { get; }
/// <summary>
/// Or It's user-friendly name to display (displayName).
/// </summary>
string Name { get; }
/// <summary>
/// Defines the state of the task being executed.
/// </summary>
TaskState State { get; }
/// <summary>
/// The task being executed.
/// </summary>
ITask Task { get; }
/// <summary>
/// Entity responsible for the execution of the current task
(null when all tasks are completed)
/// </summary>
[CanBeNull]
IEntity Entity { get; }
/// <summary>
/// The process in which the task falls.
/// Can be null for workitems that are being executed outside a process (ad hoc).
/// </summary>
[CanBeNull]
IWorkflow Workflow { get; }
/// <summary>
/// The item being processed by the task or flow.
/// Can be null for tasks that do not have an object that is being processed.
/// </summary>
[CanBeNull]
IItem Item { get; }
/// <summary>
/// The workitem that resulte in the generation of a child workitem.
/// Used for workflows which have embedded workflows and for parallel tasks.
/// Can be null for workitem that are not derived from other workitems.
/// </summary>
[CanBeNull]
IWorkitem Parent { get; }
/// <summary>
/// The name of the workflow provider.
/// </summary>
[CanBeNull]
string Provider { get; }
}
/// <summary>
/// This interface is used to represent triggers (time or event based signals
```

-continued

```
that cause a task to be executed).
/// </summary>
public interface ITrigger : IItem
{
/// <summary>
/// ReferenceId should be used by all interfaces that have objects
that are frequently known by their external identifier.
/// </summary>
[CanBeNull]
string ReferenceId { get; }
/// <summary>
/// Or It's user-friendly name to display (displayName).
/// </summary>
string Name { get; }
/// <summary>
/// The type of Trigger
/// </summary>
TriggerType TriggerType { get; }
/// <summary>
/// The status of the Trigger (enabled/disabled)
/// </summary>
TriggerStatus Status { get; }
/// <summary>
/// The item associated with the trigger
/// </summary>
IItem Item { get; }
/// <summary>
/// The task to be executed if the trigger is fired
/// </summary>
ITask Task { get; }
/// <summary>
/// The task to be executed if the trigger is fired
/// </summary>
[CanBeNull]
IWorkflow Workflow { get; }
/// <summary>
/// The name of the provider.
/// </summary>
[CanBeNull]
string Provider
{ get;
/// <summary>
/// The number of times the Trigger has been fired.
/// </summary>
int Counter { get;
/// <summary>
/// Used to store additional data
/// </summary>
[CanBeNull]
string OtherData { get; }
}
```

The disclosed embodiments can be implemented by various computing devices programmed with software and/or firmware to provide the disclosed functions and modules of executable code implemented by hardware. The software and/or firmware can be stored as executable code on one or more non-transient computer-readable media. The computing devices may be operatively linked via one or more electronic communication links. For example, such electronic communication links may be established, at least in part, via a network such as the Internet and/or other networks.

A given computing device may include one or more processors configured to execute computer program modules. The computer program modules may be configured to enable an expert or user associated with the given computing platform to interface with the system and/or external resources. By way of non-limiting example, the given computing platform may include one or more of a server, a desktop computer, a laptop computer, a handheld computer, a tablet computing platform, a Smartphone, a gaming console, and/or other computing platforms.

The various data and code can be stored in electronic storage devices which may comprise non-transitory storage media that electronically stores information. The electronic storage media of the electronic storage may include one or both of system storage that is provided integrally (i.e., substantially non-removable) with the computing devices and/or removable storage that is removably connectable to the computing devices via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Processor(s) of the computing devices may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Additional alternative structural and functional designs may be implemented for cryptographically linked, but procedurally separated, authentication and authorization in the context of a signing transaction. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

Figure 18:
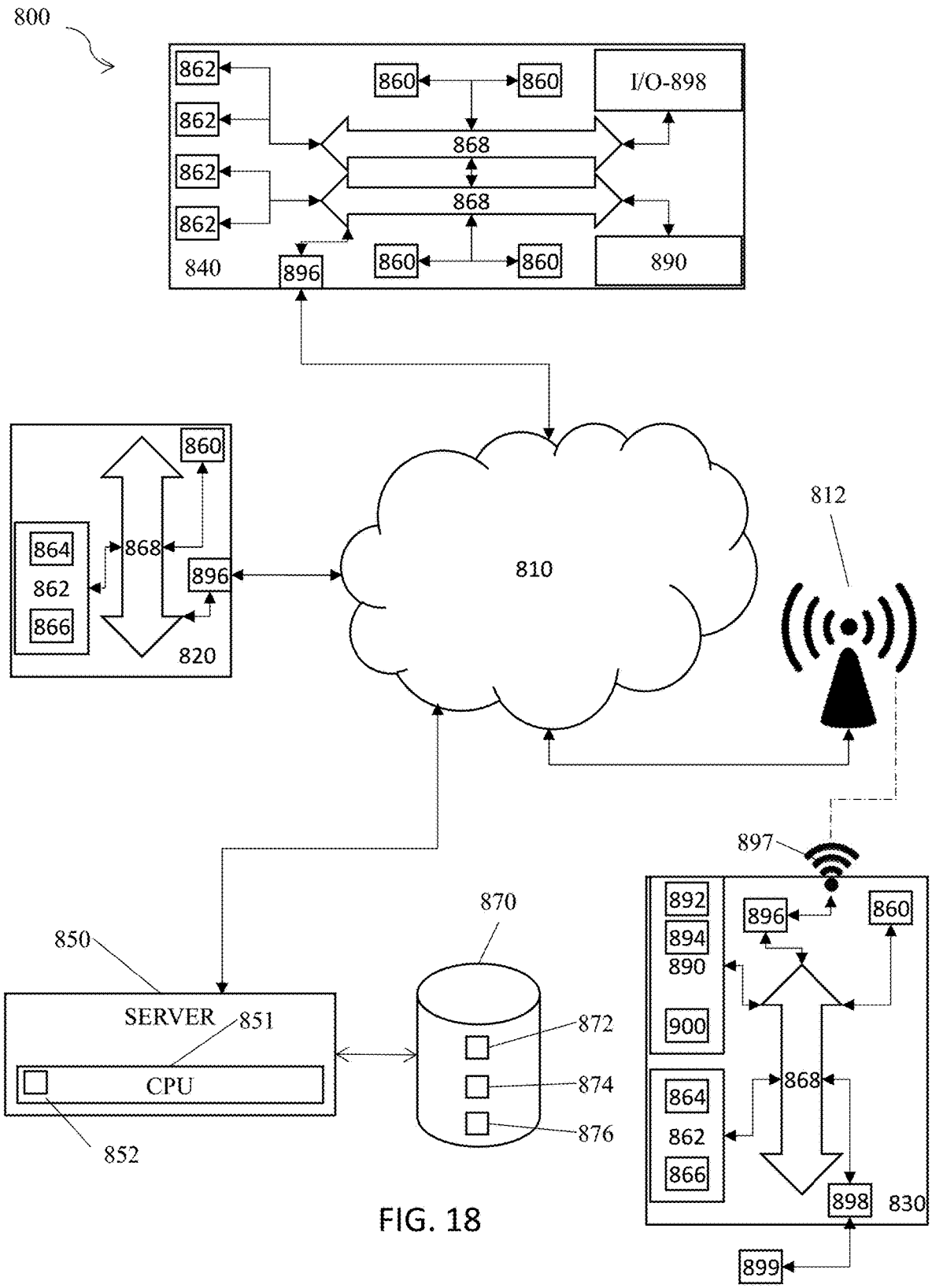
FIG. 18 is a schematic diagram of a system of the present invention.

FIG. 18 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 18, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 18, is operable to include other components that are not explicitly shown in FIG. 18, or is operable to utilize an architecture completely different than that shown in FIG. 18. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention Data Stored on a Distributed Ledger In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/ or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COINBASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself, however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, EIP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for separating authentication and authorization of a transaction on a Distributed Ledger Technology (DLT) comprising:
   an actor initiating a transaction on the DLT to exercise the authority of an entity;
   authenticating the actor;
   creating an access token including a cryptographic component needed to sign the transaction on the DLT, symmetrically encrypting the access token with a shared key, fragmenting the shared key to produce a plurality of key fragments, and disseminating the plurality of key fragments throughout an authority structure of the entity;

the actor acquiring the plurality of key fragments from the entity's authority structure;

assembling the shared key with the plurality of key fragments;

decrypting the access token with the shared key;

verifying a right of the actor to execute the transaction on behalf of the entity evidenced by the decrypted access token;

executing the transaction on the DLT through a signed transaction using the cryptographic component of the access token; and publishing the transaction to the DLT.

2. The method of claim 1, wherein verifying the actor's right to execute the transaction on behalf of the entity includes using secure Multi-Party Computation (MPC).

3. The method of claim 1, wherein verifying the actor's right to execute the transaction on behalf of the entity includes using a multiple signature (multisig) wallet two of X or three of X signing standard.

4. The method of claim 1, wherein the signed transaction provides traceability as to the actor exercising the authority of the entity, the context of the transaction, and/or how the authority was obtained.

5. The method of claim 1, wherein the decrypting the access key requires production of the key fragments in a predetermined order representative of the entity's authority structure.

6. The method of claim 1, wherein the transaction originates from a digital wallet associated with the entity.

7. The method of claim 6, wherein the digital wallet associated with the entity is a vault wallet, group wallet, and/or Multiple Signature (multisig) wallet.

8. The method of claim 1, wherein the access token is an off-chain cryptographically signed data packet.

9. The method of claim 1, wherein the access token includes an expiration date, expiring the operability of the access token after a predetermined time.

10. The method of claim 1, wherein the actor is authenticated by presenting a public key and a private key of a digital wallet associated with the entity.

11. The method of claim 1, wherein the actor is a Non-Person Entity (NPE) associated with a trigger that specifies an event to initiate the transaction.

* * * * *